US012573777B2

(12) United States Patent
He et al.

(10) Patent No.: US 12,573,777 B2

(45) Date of Patent: Mar. 10, 2026

(54) RELIABLE, ROBUST CARD EDGE CONNECTOR

(71) Applicant: Amphenol Commercial Products (Chengdu) Co., Ltd., Chengdu (CN)

(72) Inventors: Rui He, Chengdu (CN); Xiaodong Hu, Chengdu (CN); Kui Yang, Chengdu (CN); Yaohua Hou, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 304 days.

(21) Appl. No.: 18/133,601

(22) Filed: Apr. 12, 2023

(65) Prior Publication Data

US 2023/0335931 A1 Oct. 19, 2023

(30) Foreign Application Priority Data

Apr. 18, 2022 (CN) ......................... 202210402939.5
Apr. 18, 2022 (CN) ......................... 202220896693.7

(51) Int. Cl.
*H01R 12/72* (2011.01)
*H01R 12/73* (2011.01)
*H01R 13/627* (2006.01)

(52) U.S. Cl.
CPC ......... *H01R 12/721* (2013.01); *H01R 12/737* (2013.01); *H01R 13/6273* (2013.01)

(58) Field of Classification Search
CPC . H01R 12/721; H01R 12/737; H01R 13/6273
(Continued)

(56) References Cited

U.S. PATENT DOCUMENTS 5,429,523 A * 7/1995 Tondreault ......... H01R 12/7005 439/157
5,558,528 A * 9/1996 Cheng ................ H01R 12/7005 439/155
(Continued)

FOREIGN PATENT DOCUMENTS

CN 101783451 A 7/2010
CN 101752735 B * 8/2012 ......... H01R 12/7029
(Continued)

OTHER PUBLICATIONS

Yang et al., Field Installable Card Edge Connector, U.S. Appl. No. 18/101,998, filed Jan. 26, 2023.
(Continued)

*Primary Examiner* — Peter G Leigh
(74) *Attorney, Agent, or Firm* — Wolf, Greenfield & Sacks, P.C.

(57) ABSTRACT

Card edge connectors that are reliable and robust against impacts by external forces while having narrower widths by industry standards. A connector includes a housing having a body with a slot elongated longitudinally. The housing has a pair of towers extending vertically from opposite ends of the longitudinal slot. Each tower has a slot elongated vertically, and is narrower than the body in a transverse direction. The longitudinal slot and the vertical slots are configured to receive edges of an electronic card. The connector has a pair of reinforcing members. Each reinforcing member is at least partially disposed on a tower and configured to support a joint between the tower and the body of the housing. Such a configuration can increase robustness of the connector at the joints and therefore reduce the risks of deforming or cracking the towers when the connector is impacted by an external force.

20 Claims, 14 Drawing Sheets

(58) Field of Classification Search
USPC .......................................................... 439/327
See application file for complete search history.

(56) References Cited

U.S. PATENT DOCUMENTS

| | | | | |
|---|---|---|---|---|
| 5,730,611 | A * | 3/1998 | Cheng | H01R 13/6335 439/157 |
| 6,030,245 | A * | 2/2000 | Choy | H01R 12/7005 439/328 |
| 6,042,411 | A * | 3/2000 | Choy | H01R 12/7005 439/328 |
| 6,312,279 | B1 * | 11/2001 | Rachui | H01R 12/7005 439/377 |
| 6,341,971 | B1 * | 1/2002 | Choy | H01R 12/7005 439/326 |
| 6,743,028 | B2 * | 6/2004 | Wang | H01R 12/83 439/328 |
| 6,796,825 | B2 * | 9/2004 | Wang | H01R 13/6315 439/326 |
| 6,843,663 | B2 * | 1/2005 | Lee | G06K 7/0082 439/92 |
| 6,939,156 | B2 * | 9/2005 | Lee | G06K 7/0082 439/328 |
| 6,948,964 | B2 * | 9/2005 | Lee | H05K 7/1431 439/328 |
| 7,074,067 | B2 * | 7/2006 | Yang | H01R 12/83 439/328 |
| 7,175,461 | B1 * | 2/2007 | Ju | H01R 12/7005 439/328 |
| 7,607,949 | B2 | 10/2009 | Hsu | |
| 7,637,783 | B2 | 12/2009 | Sasaoka et al. | |
| 7,645,150 | B1 | 1/2010 | Chang | |
| 7,666,011 | B2 | 2/2010 | Lim et al. | |
| 7,677,907 | B2 * | 3/2010 | Guan | H01R 12/721 439/157 |
| 7,731,541 | B1 | 6/2010 | Lee et al. | |
| 7,789,681 | B2 | 9/2010 | Guan et al. | |
| 7,789,692 | B2 | 9/2010 | Lee | |
| 7,866,995 | B1 | 1/2011 | Kudo | |
| 7,892,006 | B2 | 2/2011 | Guan et al. | |
| 7,918,683 | B1 | 4/2011 | Hamner et al. | |
| 7,922,506 | B1 | 4/2011 | Harlan et al. | |
| 7,955,098 | B1 | 6/2011 | McKee et al. | |
| 7,972,171 | B2 | 7/2011 | The | |
| 8,025,507 | B2 | 9/2011 | Kim et al. | |
| 8,052,448 | B2 | 11/2011 | McKee | |
| 8,070,499 | B2 | 12/2011 | Guan et al. | |
| 8,075,330 | B1 | 12/2011 | Deng et al. | |
| 8,134,875 | B2 | 3/2012 | Baxter | |
| 8,142,207 | B1 | 3/2012 | Ljubijankic et al. | |
| 8,157,576 | B2 | 4/2012 | Fu et al. | |
| 8,187,031 | B2 | 5/2012 | Li et al. | |
| 8,235,738 | B2 | 8/2012 | Li et al. | |
| 8,235,740 | B2 | 8/2012 | Tsai | |
| 8,328,567 | B1 | 12/2012 | Yang | |
| 8,403,689 | B2 * | 3/2013 | Li | H01R 12/721 439/160 |
| 8,517,746 | B2 * | 8/2013 | Manickam | H01R 13/633 439/160 |
| 8,535,077 | B2 | 9/2013 | Shen et al. | |
| 8,616,903 | B2 | 12/2013 | Li et al. | |
| 8,636,528 | B2 | 1/2014 | Sass et al. | |
| 8,721,350 | B2 | 5/2014 | Liu et al. | |
| 8,730,668 | B2 | 5/2014 | Hu et al. | |
| 8,753,138 | B2 | 6/2014 | Foster, Sr. et al. | |
| 8,834,190 | B2 | 9/2014 | Ngo et al. | |
| 8,858,257 | B2 | 10/2014 | Mo et al. | |
| 8,961,211 | B2 * | 2/2015 | Zhu | H01R 12/707 439/326 |
| 9,166,317 | B2 | 10/2015 | Briant et al. | |
| 9,190,750 | B2 | 11/2015 | Takeuchi et al. | |
| 9,325,090 | B2 | 4/2016 | Shen et al. | |
| 9,431,734 | B2 | 8/2016 | Guo et al. | |
| 9,666,971 | B1 | 5/2017 | Lai et al. | |
| 9,685,723 | B2 | 6/2017 | Kee Mew | |
| 9,806,460 | B2 | 10/2017 | Li et al. | |
| 9,806,461 | B2 | 10/2017 | Xu et al. | |
| 9,876,314 | B1 | 1/2018 | Cai | |
| 9,887,485 | B2 | 2/2018 | Lambie et al. | |
| 9,935,384 | B1 | 4/2018 | Li et al. | |
| 9,941,621 | B2 | 4/2018 | Tang | |
| 10,038,277 | B2 * | 7/2018 | Sun | H01R 12/721 |
| 10,056,715 | B2 | 8/2018 | Cai | |
| 10,062,991 | B2 | 8/2018 | Wang et al. | |
| 10,070,549 | B2 | 9/2018 | Su et al. | |
| 10,103,476 | B1 | 10/2018 | Qiu et al. | |
| 10,125,929 | B2 | 11/2018 | Lai et al. | |
| 10,135,165 | B2 | 11/2018 | Zuo | |
| 10,177,473 | B2 | 1/2019 | Bu et al. | |
| 10,224,653 | B2 | 3/2019 | Niu et al. | |
| 10,301,845 | B2 | 5/2019 | Hsu et al. | |
| D852,752 | S | 7/2019 | Uchida | |
| 10,355,408 | B2 | 7/2019 | Tanaka et al. | |
| 10,461,467 | B2 | 10/2019 | Eppley et al. | |
| 10,470,313 | B1 | 11/2019 | Phillips et al. | |
| 10,651,597 | B2 | 5/2020 | Xie et al. | |
| 10,720,730 | B2 | 7/2020 | Wang et al. | |
| 10,741,944 | B2 | 8/2020 | Long | |
| 10,855,020 | B1 | 12/2020 | Phillips et al. | |
| 10,916,894 | B2 | 2/2021 | Kirk et al. | |
| 11,081,827 | B2 | 8/2021 | Eng-Kan | |
| 11,189,970 | B2 | 11/2021 | Liu et al. | |
| 11,374,340 | B2 | 6/2022 | Tang | |
| 11,374,360 | B2 | 6/2022 | Faith et al. | |
| 11,545,769 | B2 | 1/2023 | Comerci et al. | |
| 11,637,391 | B2 | 4/2023 | Guo et al. | |
| 11,710,923 | B2 | 7/2023 | Hu et al. | |
| 11,817,639 | B2 | 11/2023 | Yi et al. | |
| 11,973,286 | B2 | 4/2024 | Hu | |
| 12,051,867 | B2 | 7/2024 | Liu et al. | |
| 12,401,157 | B2 | 8/2025 | Yang et al. | |
| 12,431,644 | B2 | 9/2025 | Hu | |
| 2006/0094277 | A1 * | 5/2006 | Yang | H01R 12/83 439/328 |
| 2008/0220642 | A1 * | 9/2008 | Guan | H01R 12/7029 439/325 |
| 2010/0015820 | A1 * | 1/2010 | Wang | H01R 12/88 439/59 |
| 2010/0075538 | A1 | 3/2010 | Ohshida | |
| 2010/0081296 | A1 | 4/2010 | Nishiyama | |
| 2010/0159723 | A1 | 6/2010 | Tan | |
| 2010/0323544 | A1 * | 12/2010 | Kudo | H01R 12/7005 439/159 |
| 2011/0021045 | A1 | 1/2011 | Tan | |
| 2011/0021080 | A1 | 1/2011 | Kamiya et al. | |
| 2011/0065297 | A1 | 3/2011 | Guan et al. | |
| 2011/0097913 | A1 | 4/2011 | Fu et al. | |
| 2011/0104913 | A1 | 5/2011 | Hinkle | |
| 2011/0104952 | A1 | 5/2011 | Teh | |
| 2011/0111614 | A1 * | 5/2011 | Kato | H01R 12/721 439/328 |
| 2011/0117768 | A1 | 5/2011 | Li et al. | |
| 2011/0136388 | A1 | 6/2011 | Fu et al. | |
| 2011/0143563 | A1 | 6/2011 | Li et al. | |
| 2011/0159718 | A1 | 6/2011 | Mckee | |
| 2011/0275238 | A1 | 11/2011 | Iijima et al. | |
| 2012/0108092 | A1 | 5/2012 | Li et al. | |
| 2012/0135618 | A1 | 5/2012 | Shen et al. | |
| 2012/0156912 | A1 | 6/2012 | Shen et al. | |
| 2012/0164859 | A1 | 6/2012 | Li et al. | |
| 2012/0178274 | A1 * | 7/2012 | Manickam | H01R 12/7005 439/157 |
| 2012/0202387 | A1 | 8/2012 | McNamara | |
| 2012/0244734 | A1 | 9/2012 | Fu et al. | |
| 2012/0329301 | A1 | 12/2012 | Li et al. | |
| 2013/0059455 | A1 | 3/2013 | Li et al. | |
| 2013/0095679 | A1 | 4/2013 | Li et al. | |
| 2013/0109216 | A1 | 5/2013 | Chien | |
| 2013/0130526 | A1 | 5/2013 | Mo et al. | |
| 2013/0280926 | A1 | 10/2013 | Ono | |
| 2013/0288504 | A1 | 10/2013 | Sass et al. | |
| 2013/0309892 | A1 * | 11/2013 | Chen | H01R 12/7029 439/327 |

(56) References Cited

U.S. PATENT DOCUMENTS

| | | | |
|---|---|---|---|
| 2014/0213085 | A1 | 7/2014 | Yao et al. |
| 2014/0273647 | A1* | 9/2014 | Ma ........................ H01R 12/88 439/630 |
| 2014/0364000 | A1 | 12/2014 | Tang et al. |
| 2014/0377972 | A1 | 12/2014 | Tang et al. |
| 2015/0327389 | A1 | 11/2015 | Westphall |
| 2016/0020540 | A1 | 1/2016 | Shen et al. |
| 2016/0118736 | A1 | 4/2016 | Hoyack et al. |
| 2016/0190724 | A1 | 6/2016 | Mito |
| 2016/0336667 | A1* | 11/2016 | Kee Mew .......... H01R 12/7005 |
| 2017/0012389 | A1 | 1/2017 | Li et al. |
| 2017/0302031 | A1 | 10/2017 | Cheng et al. |
| 2018/0019541 | A1* | 1/2018 | Cai ...................... H01R 12/721 |
| 2018/0198220 | A1 | 7/2018 | Sasame et al. |
| 2018/0212361 | A1 | 7/2018 | Eppley et al. |
| 2018/0261937 | A1 | 9/2018 | Bu et al. |
| 2019/0165518 | A1 | 5/2019 | Hsu et al. |
| 2019/0173209 | A1 | 6/2019 | Lu et al. |
| 2019/0173232 | A1 | 6/2019 | Lu et al. |
| 2019/0199023 | A1 | 6/2019 | Soh |
| 2019/0363488 | A1 | 11/2019 | Xie et al. |
| 2020/0076131 | A1 | 3/2020 | Hu et al. |
| 2020/0076135 | A1 | 3/2020 | Tang et al. |
| 2020/0127397 | A1 | 4/2020 | Fang et al. |
| 2020/0203867 | A1 | 6/2020 | Lu |
| 2021/0153351 | A1 | 5/2021 | Li et al. |
| 2021/0184377 | A1 | 6/2021 | Dong et al. |
| 2021/0203090 | A1 | 7/2021 | Gooi et al. |
| 2021/0262502 | A1 | 8/2021 | Wang et al. |
| 2021/0278880 | A1 | 9/2021 | Chang et al. |
| 2021/0288423 | A1 | 9/2021 | Guo et al. |
| 2021/0351529 | A1 | 11/2021 | Yang et al. |
| 2021/0376508 | A1 | 12/2021 | Hu |
| 2021/0408724 | A1 | 12/2021 | Li et al. |
| 2022/0037828 | A1 | 2/2022 | Hu et al. |
| 2022/0069496 | A1 | 3/2022 | Yi et al. |
| 2022/0181809 | A1 | 6/2022 | Xie et al. |
| 2022/0181811 | A1 | 6/2022 | Liu et al. |
| 2022/0247107 | A1 | 8/2022 | Tang et al. |
| 2022/0399682 | A1 | 12/2022 | Gooi et al. |
| 2023/0096092 | A1 | 3/2023 | Hu |
| 2023/0126150 | A1 | 4/2023 | Yang et al. |
| 2023/0163500 | A1 | 5/2023 | Yang et al. |
| 2023/0178916 | A1 | 6/2023 | Yang et al. |
| 2023/0178935 | A1 | 6/2023 | Lai et al. |
| 2023/0180389 | A1 | 6/2023 | Lai et al. |
| 2023/0180418 | A1 | 6/2023 | Lai et al. |
| 2023/0238724 | A1 | 7/2023 | Yang et al. |
| 2024/0014585 | A1 | 1/2024 | Yang et al. |
| 2024/0014596 | A1 | 1/2024 | Yang et al. |
| 2024/0072467 | A1 | 2/2024 | Yang et al. |
| 2024/0072468 | A1 | 2/2024 | Yang et al. |
| 2024/0162638 | A1 | 5/2024 | Yang et al. |
| 2024/0258728 | A1 | 8/2024 | Hu |
| 2024/0275089 | A1 | 8/2024 | Yang et al. |
| 2024/0275090 | A1 | 8/2024 | Yang et al. |
| 2024/0283195 | A1 | 8/2024 | Yang et al. |
| 2024/0297451 | A1 | 9/2024 | He et al. |
| 2024/0332858 | A1 | 10/2024 | He et al. |
| 2024/0371411 | A1 | 11/2024 | Yang et al. |

FOREIGN PATENT DOCUMENTS

| | | | | |
|---|---|---|---|---|
| CN | 102684007 | A | * | 9/2012 |
| CN | 102694287 | A | * | 9/2012 |
| CN | 202633554 | U | | 12/2012 |
| CN | 102074818 | B | | 6/2014 |
| CN | 203660106 | U | | 6/2014 |
| CN | 105098408 | A | | 11/2015 |
| CN | 105703103 | A | | 6/2016 |
| CN | 107681301 | A | | 2/2018 |
| CN | 108539464 | A | | 9/2018 |
| CN | 208173836 | U | | 11/2018 |
| CN | 208637635 | U | | 3/2019 |
| CN | 109997280 | A | | 7/2019 |
| CN | 107768862 | B | | 7/2020 |
| CN | 212874843 | U | | 4/2021 |
| CN | 212934921 | U | | 4/2021 |
| CN | 214505858 | U | | 10/2021 |
| CN | 114649698 | A | | 6/2022 |
| CN | 217823414 | U | | 11/2022 |
| GB | 227943 | A | | 1/1925 |
| JP | 2010-073641 | A | | 4/2010 |
| JP | 5849166 | B1 | | 1/2016 |
| TW | 200835073 | A | | 8/2008 |
| TW | M475740 | U | | 4/2014 |
| TW | M571602 | U | | 12/2018 |
| TW | I678030 | B | | 11/2019 |
| TW | M623486 | U | | 2/2022 |
| TW | M624630 | U | | 3/2022 |
| TW | M625349 | U | | 4/2022 |
| TW | M630230 | U | | 8/2022 |
| WO | WO 02/073819 | A2 | | 9/2002 |
| WO | WO 2011/014676 | A1 | | 2/2011 |

OTHER PUBLICATIONS

Yang et al., Robust Card Edge Connector, U.S. Appl. No. 18/346,150, filed Jun. 30, 2023.

Yang et al., Reliable Card Edge Connector with Narrow Latch, U.S. Appl. No. 18/346,155, filed Jun. 30, 2023.

[No Author Listed], DDR5 Memory Module Sockets (SMT). Storage & Server IO. Amphenol ICC. 2022. 2 pages. URL:https://cdn.amphenol-cs.com/media/wysiwyg/files/documentation/datasheet/ssio/ssio_ddr5_smt.pdf [last accessed Mar. 22, 2022].

[No Author Listed], DDR5 SDRAM—Wikipedia. Aug. 8, 2021. 6 pages. URL:https://en.wikipedia.org/wiki/DDR5_SDRAM [last accessed on Aug. 16, 2021].

[No Author Listed], MCIO 124pos 85ohm. Amphenol Assembletech. 1 page. URL:http://www.amphenol-ast.com/v3/en/overview.aspx?classId=234 [retrieved on Apr. 11, 2022].

[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].

[No Author Listed], Mini Cool Edge IO Connector. Commercial IO. Amphenol ICC. 2022. 5 pages. URL:https://cdn.amphenol-icc.com/media/wysiwyg/files/documentation/datasheet/inputoutput/io_mini_cool_edge_io.pdf [retrieved on Apr. 11, 2022].

Armasu, What We Know About DDR5 So Far. Jun. 7, 2019. 20 pages. URL:https://www.tomshardware.com/news/what-we-know-ddr5-ram,39079.html [last accessed Jul. 21, 2022].

[No Author Listed], Amphenol Information Communications and Commerical Products. Amphenol ICC Storage & Server IO. 2023, 10 pages. URL:https://cdn.amphenol-cs.com/media/wysiwyg/files/documentation/customerpresentation/ddr4_product_presentation.pdf [retrieved on Dec. 19, 2023].

Liu, AMD and JEDEC Develop DDR5 MRDIMMs with speeds up to 17,600 MT/s. Tom's Hardware. Apr. 2, 2023. 10 pages. URL:https://www.tomshardware.com/news/amd-advocates-ddr5-mrdimms-with-speeds-up-to-17600-mts?utm_term=034EABA0-A571-4079-9F40-260730599864&utm_campaign=9135C55F-ADEA-46B0-AE23-6A29A19E48B6&utm_medium=email&utm_content=9DC021C3-BB01-4A10-BEE1-CDCF329DDE49&utm_source=SmartBrief [retrieved on Aug. 2, 2024].

* cited by examiner

RELIABLE, ROBUST CARD EDGE CONNECTOR

RELATED APPLICATIONS

This application claims priority to and the benefit of Chinese Patent Application Serial Nos. 202220896693.7 and 202210402939.5, both filed on Apr. 18, 2022, both entitled "ELECTRICAL CONNECTOR." The contents of these applications are incorporated herein by reference in their entirety.

FIELD

This application relates generally to interconnection systems, such as those including electrical connectors, used to interconnect electronic assemblies.

BACKGROUND

An electrical connector in an electronic system is configured to connect circuits on one printed circuit board (PCB) to the circuits on another PCB. For some systems, it is easier and more cost-effective to manufacture most of the circuits of the system on separate electronic assemblies, for example, PCBs. The electronic assemblies may be connected together by an electrical connector. A common example is a memory card inserted into the electrical connector on a mainboard of a personal computer.

Electrical connectors may be used to interconnect electronic cards in a system. An electronic card may include, but is not limited to, a graphics card, a memory card, or other cards described as add in cards. Double Data Rate 5 (DDR5) is a type of memory widely used in computers at present. A DDR5 card may be interconnected with a mainboard of a computer via an electrical connector. The electrical connector may be mounted on a mainboard, and conductive elements of the electrical connector may be connected to circuits on the mainboard. The electronic card may be electrically connected to the electrical connector by connecting contact pads on the electronic card and the conductive elements of the electrical connector. The electronic card may therefore be electrically connected to circuits on the mainboard.

A known design for an electrical connector for a DDR5 card may have an insulating housing provided with a card slot. The card slot may extend into towers on either end of the insulating body. The lower edge of the DDR5 memory card may be inserted into the card slot. The insulating body is generally made of a plastic material. Dimensions of the electrical connector may be set by standards. For DDR5 connectors, the height of the body may be set by standard, as may be the width of the towers. In an DDR5 narrow latch connector, the specified width of the tower may be narrower than in the conventional DDR5 design.

BRIEF SUMMARY

Aspects of the present disclosure relate to electrical connectors that are reliable and robust.

Some embodiments relate to an electrical connector. The electrical connector may comprise a housing comprising a body comprising a mounting surface and an interfacing surface opposite to the mounting surface in a vertical direction, a tower protruding from an end of the interfacing surface in the vertical direction, and a slot comprising a first portion extending in the body in a longitudinal direction perpendicular to the vertical direction and a second portion extending in the tower in the vertical direction; and a reinforcing member comprising a first portion at least partially wrapping a distal end of the tower, and a second portion extending in the vertical direction beyond a joint between the tower and the body.

Optionally, the reinforcing member may span the joint and may be connected to both the tower and the body of the housing.

Optionally, the joint may be a first joint between the tower and the body on a first side of the slot; the reinforcing member may comprise a third portion extending in the vertical direction beyond a second joint between the tower and the body; and the second joint may be on a second side of the slot opposite the first side.

Optionally, the first portion of the reinforcing member may be on the exterior of the tower.

Optionally, the second portion of the reinforcing member may extend into the body of the housing by insertion into the first portion of the slot.

Optionally, the tower may comprise a pair of side walls disposed on opposite sides of the slot in a transverse direction perpendicular to both the vertical direction and longitudinal direction, and an end wall connecting the pair of side walls; the pair of side walls and the end wall may at least partially surround the second portion of the slot; and the second portion of the reinforcing member may extend along a side wall of the pair of side walls.

Optionally, the second portion of the reinforcing member may comprise two parts, each of the two parts extending along a side wall of the pair of side walls.

Optionally, the first portion of the reinforcing member may extend along the pair of side walls in the longitudinal direction and the end wall in the transverse direction.

Optionally, the electrical connector may comprise a plurality of conductive elements, each of the conductive elements comprising a mating contact portion curving into the first portion of the slot, and a mounting contact portion extending out of the body through the mounting surface.

Optionally, a transverse width of the tower may be less than a transverse width of the body of the housing.

Some embodiments relate to an electrical connector. The electrical connector may comprise a body comprising a slot extending in a longitudinal direction and a recess at an end of the slot; a latch pivotably connected to the body at a location in the recess and configured to move between a locked position and an unlocked position; a tower disposed between the slot and the recess of the body and extending in a vertical direction perpendicular to the longitudinal direction; and a reinforcing member disposed on the tower and comprising a portion elongated in the vertical direction to or beyond a position aligned with the location in the recess in the longitudinal direction.

Optionally, the tower may comprise a first recess extending along an outer side surface of the tower and into the body beyond a plane that an interfacing surface may extend; and the reinforcing member may be at least partially disposed in the first recess of the tower.

Optionally, the body may comprise a plurality of second recesses extending toward a mounting surface; the plurality of second recesses of the body may be spaced apart in the longitudinal direction; and the reinforcing member may comprise a plurality of tabs extending toward the mounting surface and disposed into respective ones of the plurality of second recesses.

Optionally, the portion of the reinforcing member elongated in the vertical direction may be embedded in the tower.

Optionally, the portion of the reinforcing member elongated in the vertical direction may be rod-shaped.

Optionally, the reinforcing member further may comprise a portion having a U-shaped cross-section in a plane perpendicular to the vertical direction with an opening of the U-shaped cross-section facing the slot.

Optionally, the tower may comprise a first block protruding from a side wall and extending to the end wall and configured to at least partially support the portion of the reinforcing member having the U-shaped cross-section.

Optionally, the tower may comprise a second block protruding from the side wall and having one end extending to a distal end of the tower and the other end extending to the body.

Optionally, the tower may comprise a first recess between the first block and the second block; and the reinforcing member may be at least partially disposed in the first recess of the tower.

Some embodiments relate to an electrical connector. The electrical connector may comprise a housing comprising a body having a slot elongated in a longitudinal direction, a pair of towers disposed on opposite ends of the slot and extending in a vertical direction perpendicular to the longitudinal direction; a plurality of conductive elements held by the body of the housing, each of the conductive elements comprising a mating contact portion curving into the slot, and a mounting contact portion extending out of the body of the housing; and a pair of reinforcing members each at least partially disposed on one of the pair of towers and configured to support a joint between the body of the housing and a respective tower.

Some embodiments relate to an electrical connector. The electrical connector may comprise an insulating housing and a reinforcing member. The insulating housing may comprise a base body and a tower, wherein the base body may be provided with an interfacing surface and a mounting surface opposite to each other in a vertical direction. The tower may protrude from the interfacing surface along the vertical direction. The interfacing surface may be provided with a card slot extending along a longitudinal direction, and the card slot may be configured to receive an electronic card. An end of the card slot may extend into the tower. The reinforcing member may be arranged on the insulating housing and may comprise a first reinforcing member portion(s) extending along the vertical direction, wherein one part of the first reinforcing member portion(s) may be inserted into the base body and the other part of the first reinforcing member portion(s) may be supported on the tower, to enhance the mechanical strength of the tower.

Optionally, the first reinforcing member portion(s) may be disposed on a side surface of the card slot.

Optionally, the tower may comprise a pair of side walls disposed on two sides of the card slot in a transverse direction, and an end wall connected between the pair of side walls. The pair of side walls and the end wall may surround the end of the card slot, and the other part of the first reinforcing member portion(s) may be supported in the side walls.

Optionally, the first reinforcing member portions may be arranged in pairs and be disposed on two sides of the card slot respectively and oppositely.

Optionally, the other part of the first reinforcing member portion(s) may abut against an outer side surface of the tower extending along the longitudinal direction.

Optionally, a first recess may extend from the outer side surface into the base body. The first recess may form a groove in the base body and an opening of the groove may face the interfacing surface, and the first reinforcing member portion(s) may be arranged in the first recess.

Optionally, the first reinforcing member portion(s) may be of a sheet shape and extend along the longitudinal direction.

Optionally, a plurality of extending recesses may extend from the bottom of the groove toward the mounting surface. The plurality of extending recesses may be spaced apart in the longitudinal direction. The first reinforcing member portion(s) may have a plurality of first reinforcing member portion tabs extending toward the mounting surface, and the plurality of first reinforcing member portion tabs may be clamped into the plurality of extending recesses in a one-to-one correspondence manner.

Optionally, the first recess may extend to the top of the tower.

Optionally, the electrical connector may further comprise a latch. The base body may be provided with a base body recess, a lower end of the latch may be in the base body recess and pivotally connected to the base body between an unlocked position and a locked position, the latch may be configured to connect to the electronic card of the electrical connector in a locked manner when being disposed at the locked position, and the first reinforcing member portion(s) may be disposed on an outer side of the base body recess in a transverse direction.

Optionally, the other part of the first reinforcing member portion(s) may be embedded in the tower.

Optionally, the first reinforcing member portion(s) may be of a rod shape.

Optionally, a second recess may extend from the top of the tower toward the mounting surface, and the first reinforcing member portion(s) may be arranged in the second recess.

Optionally, the electrical connector may further comprise a latch. The base body may be provided with a base body recess. A lower end of the latch may be in the base body recess and pivotally connected to the base body between an unlocked position and a locked position. The latch may be configured to connect to the electronic card of the electrical connector in a locked manner when being disposed at the locked position, and the first reinforcing member portion(s) may be disposed above the base body recess.

Optionally, a transverse width of the tower may be less than a transverse width of the base body.

Optionally, the reinforcing member may further comprise a second reinforcing member portion, the second reinforcing member portion may be arranged on the tower, the second reinforcing member portion may be provided with an opening, and an end of the card slot may extend into the opening.

Optionally, the second reinforcing member portion may be disposed on a side, away from the base body, of the first reinforcing member portion(s).

Optionally, the tower may be provided with a third recess, the third recess may extend to the top of the tower, and the second reinforcing member portion may be inserted into the third recess from a position above the tower.

Optionally, the first reinforcing member portion(s) may be mounted to the insulating housing through the third recess.

Optionally, the tower may comprise a pair of side walls disposed on two sides of the card slot, and an end wall connected between the pair of side walls. The pair of side walls and the end wall may surround the end of the card slot. The third recess may comprise a pair of side recesses disposed on the pair of side walls respectively, and an end recess disposed on the end wall. The end recess may be connected between the pair of side recesses.

Optionally, a first recess extending along the vertical direction may be arranged on one or two of the pair of side walls. One end of the first recess may communicate with the side recess on the side wall where the first recess is arranged, and the other end of the first recess may extend into the base body. The first reinforcing member portion(s) may be inserted into the first recess through the third recess.

Optionally, a first protruded block may be arranged on the side wall where the first recess is disposed. The first protruded block may extend to the end wall along the longitudinal direction and may be disposed below the side recess on the side wall where the first protruded block is arranged, and the first protruded block may form a first side wall of the first recess.

Optionally, a second protruded block may be arranged on the side wall where the first recess is disposed. One end of the second protruded block may extend to the top of the tower and the other end of the second protruded block may extend to the base body. The second protruded block may form a second side wall of the first recess.

Optionally, an opening groove may be formed on the top of the tower in one or two of the pair of side walls of the tower. The opening groove may penetrate along a transverse direction through the side wall where the opening groove is disposed. The second reinforcing member portion may comprise a reinforcing body and an barb. The reinforcing body may be of a U shape, and the opening of the U shape may face the card slot. The barb may extend from the edge of the opening of the U shape toward the inner side of the opening of the U shape, and the barb may be arranged in the opening groove.

Optionally, a second recess extending along the vertical direction may be arranged on the side wall where the opening groove is disposed. One end of the second recess may communicate with the opening groove and the other end of the second recess may extend into the base body. The first reinforcing member portion(s) may be inserted into the second recess through the opening groove.

Optionally, an extending opening groove may be formed at the bottom of the opening groove, the barb may be provided with a second reinforcing member portion tab, and the second reinforcing member portion tab may be clamped into the extending opening groove.

Optionally, the first reinforcing member portion(s) and the second reinforcing member portion may be integrated.

Some embodiments relate to an electrical connector. The electrical connector may comprise an insulating housing and a reinforcing member. The insulating housing may comprise a base body and a tower, wherein the base body may be provided with an interfacing surface and a mounting surface opposite to each other in a vertical direction, the tower may protrude from the interfacing surface along the vertical direction, the interfacing surface may be provided with a card slot extending along a longitudinal direction, the card slot may be configured to receive a electronic card, and an end of the card slot may extend into the tower. The reinforcing member may comprise a first reinforcing member portion(s) and a second reinforcing member portion, wherein one part of the first reinforcing member portion(s) may be inserted into the base body and the other part of the first reinforcing member portion(s) may be supported on the tower, and the second reinforcing member portion may be arranged on the tower and surround the end of the card slot.

Optionally, both the first reinforcing member portion(s) and the second reinforcing member portion may be embedded into the insulating housing, and the first reinforcing member portion(s) and the second reinforcing member portion may be configured to be inserted into the insulating housing sequentially from the top of the tower.

Optionally, the first reinforcing member portion(s) may be disposed on a side surface of the card slot.

Optionally, the tower may comprise a pair of side walls disposed on two sides of the card slot in a transverse direction, and an end wall connected between the pair of side walls. The pair of side walls and the end wall may surround the end of the card slot, and the other part of the first reinforcing member portion(s) may be supported in the side walls.

Optionally, the first reinforcing member portions may be arranged in pairs and may be disposed on two sides of the card slot respectively and oppositely.

Optionally, the other part of the first reinforcing member portion may abut against an outer side surface of the tower extending along the longitudinal direction.

Optionally, the other part of the first reinforcing member portion(s) may be embedded in the tower.

Optionally, the second reinforcing member portion may be disposed on a side, away from the base body, of the first reinforcing member portion(s).

Optionally, the first reinforcing member portion(s) and the second reinforcing member portion may be integrated.

Optionally, a transverse width of the tower may be less than a transverse width of the base body.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures is represented by a like numeral. For purposes of clarity, not every component may be labeled in every drawing. In the drawings.

Figure 1:
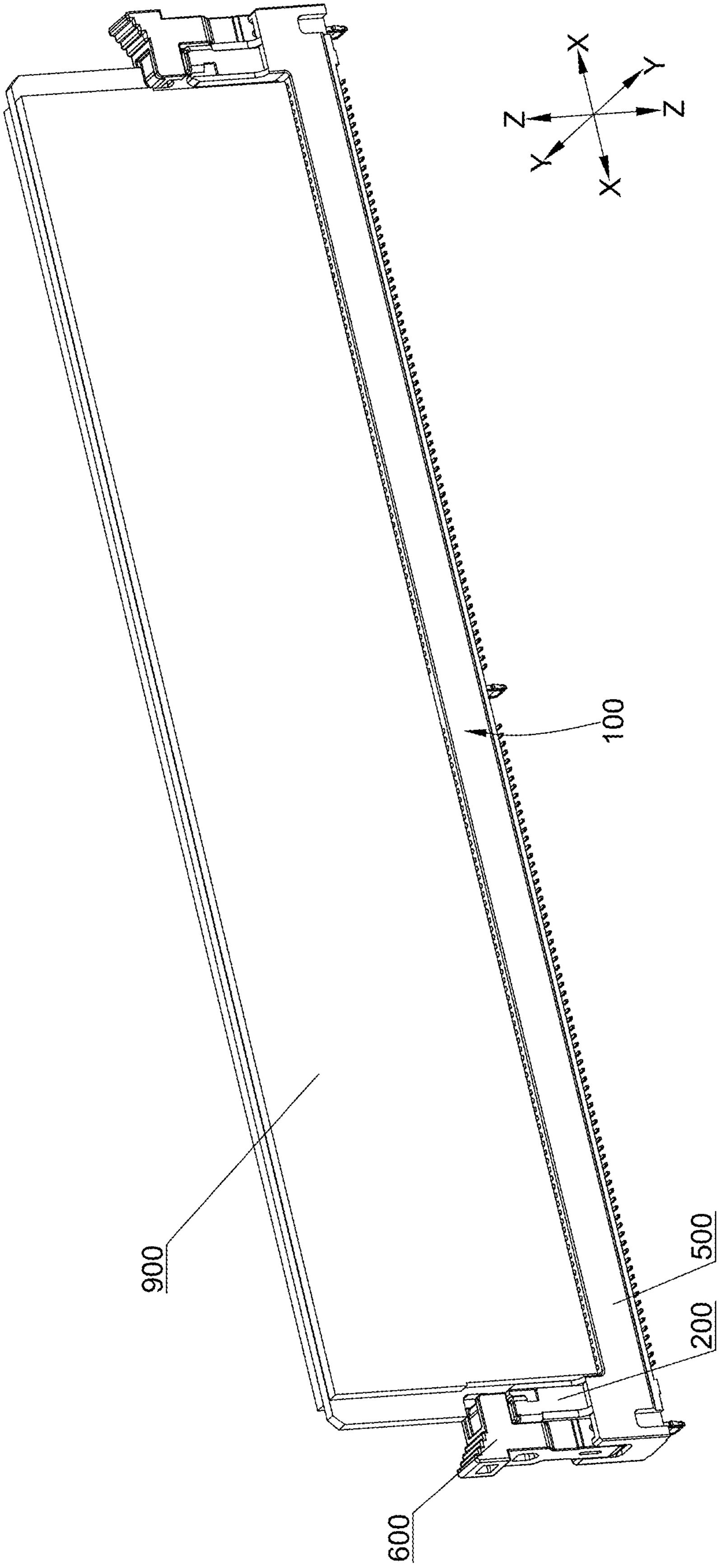
FIG. 1 is a perspective view of an electrical connector and an electronic card inserted therein, showing latches of the electrical connector in a locked position, according to some embodiments.

The above accompanying drawings include the following reference numerals:

Electrical connectors 100, 100', 100"; reinforcing members 200, 200', 200"; first reinforcing member portions 300, 300', 300"; first reinforcing member portion tab 310; second reinforcing member portions 400, 400"; opening 401; reinforcing body 410; barb 420; chamfer 421; second reinforcing member portion tab 430; second reinforcing member portion side tab 440; insulating housings 500, 500"; interfacing surface 501; mounting surface 502; base body 510; first base body 511; second base body 512; groove 513; tower 520; side wall 521; end wall 522; joints 523; card slot 530; first groove 531; second groove 532; separating rib 533; first recess 540; extending recess 541; opening groove 550; extending opening groove 551; second recess 560; third recess 570; side recess 571; end recess 572; first protruded block 581; second protruded block 582; base body recess 590; pivoting hole 591; latch 600; pivot 610; conductive element 700; electronic card 900.

DETAILED DESCRIPTION

The Inventors have recognized and appreciated connectors designs that improve reliability and robustness against impacts by external forces while satisfying narrower widths required by industry standards. With the increase of the density of electronic components in systems, narrower connectors are desired so that channels between adjacent connectors may be wider, which lets cooling air flow between the connectors and cards inserted into the connectors. Such connectors facilitate dissipating heat generated in the systems. Narrower connectors, however, may lead to an unacceptable risk of cracking in the connector housing. The inventors have recognized and appreciated that locations in a cared-edge connector housing, such as a DDR5 memory card connector, would be particularly prone to deforming and cracking. Techniques as described herein may improve robustness at those locations and therefore reduce the risks of deforming or cracking in the connectors.

A connector may include a housing having a body with a slot elongated in a longitudinal direction. The housing may have a tower extending vertically from an end of the longitudinal slot. The tower may have a slot elongated vertically, and may be narrower than the body in a transverse direction. The longitudinal slot and the vertical slot may be configured to receive edges of an electronic card.

The connector may include a latch connected to the body of the housing at locations so that the latch can move between a locked position for locking an electronic card in the slots and an unlocked position for releasing the electronic card from the slots. The latch may be disposed farther from the longitudinal slot than the tower, and may have a top portion configured to engage the electronic card at a distal end of the tower when at the locked position and rotated away from the distal end of the tower when at the unlocked position.

The connector may have one or more reinforcing members. A reinforcing member may be at least partially disposed on the tower and configured to support a joint between the tower and the body of the housing. For example, one or more reinforcing member portions may span the joint between the the body of the housing and be mechanically attached to the housing on both sides of the joint. The reinforcing member may include a first portion at least partially wrapping the distal end of the tower and a second portion extending in the vertical direction to (and in some examples beyond) a joint between the tower and the body. The first and second portions of the reinforcing member may be connected, or separated from each other. In some embodiments, the second portion of the reinforcing member may be disposed on surfaces of one or more side walls of the tower and may extend into the body of the housing. In some embodiments, the second portion of the reinforcing member may be embedded in side walls of the housing and elongated to the joint between the tower and the body of the housing. Such configurations can increase impact resistances of the connector at the joints and therefore reduce the risks of deforming or cracking the towers when the connector, or a card inserted into the connector, is impacted by an external force.

The present disclosure provides an electrical connector. A reinforcing member may be arranged in the electrical connector with this structure. The inventor has realized that the reinforcing member is helpful to improve the mechanical strength of an insulating housing, thereby inhibiting deformation or even cracking of the insulating housing. The reinforcing member particularly may improve the mechanical strength of the joint between a base body and a tower of the insulating housing, thereby inhibiting deformation or even cracking of the joint. The electrical connectors of some embodiments is described below in detail with reference to specific drawings.

In the following description, details are provided to enable an understanding of the present disclosure. However, a person skilled in the art may understand that the following description only exemplarily shows the preferred embodiments of the present disclosure, and the present disclosure may be implemented without one or more such details. In addition, in order to avoid confusion with the present disclosure, some technical features known in the art have not been described in detail.

For clear and concise description, a vertical direction Z-Z, a longitudinal direction X-X and a transverse direction Y-Y are defined. The vertical direction Z-Z, the longitudinal direction X-X and the transverse direction Y-Y may be perpendicular to one another. The vertical direction Z-Z refers to a height direction of the electrical connector. The longitudinal direction X-X refers to a length direction of the electrical connector. The transverse direction Y-Y refers to a width direction of the electrical connector.

Figure 2:
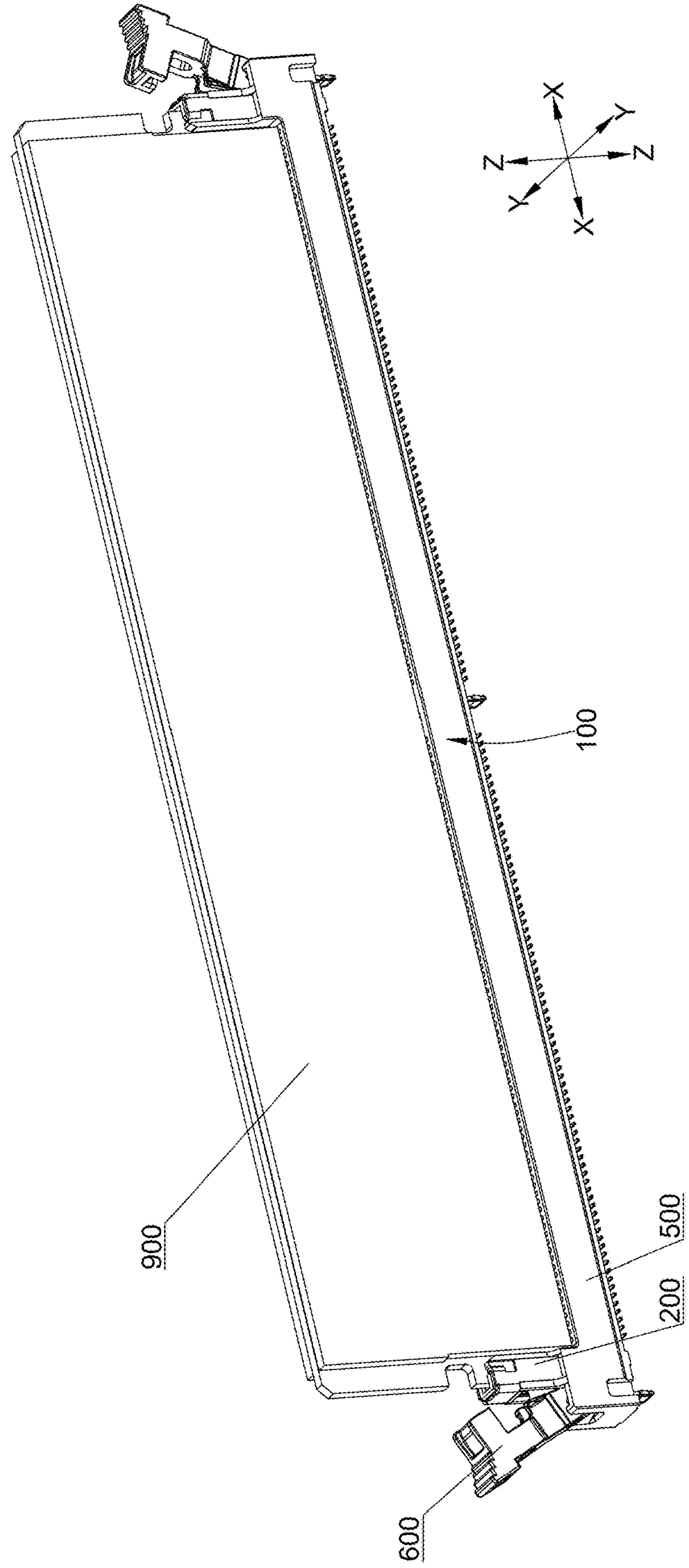
FIG. 2 is a perspective view of the electrical connector and the electronic card shown in FIG. 1, showing the latches of the electrical connector in an unlocked position.
Figure 3:
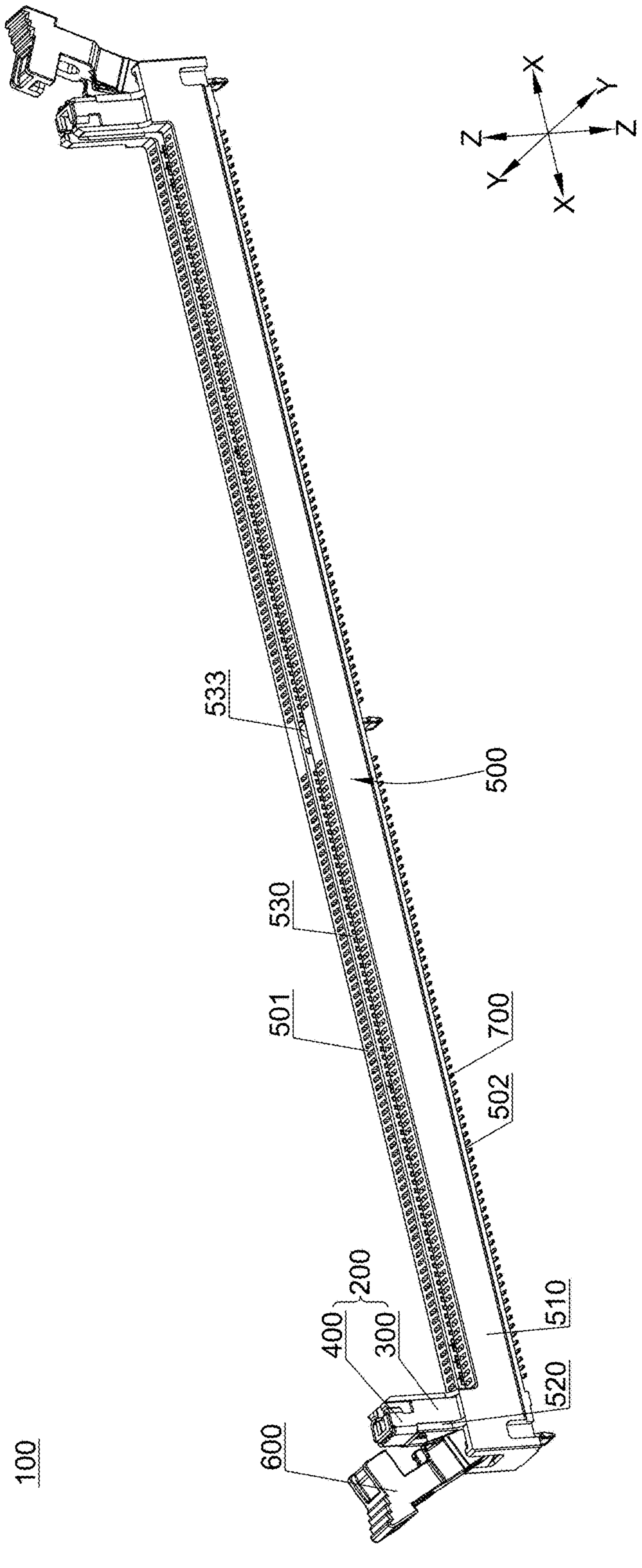
FIG. 3 is a perspective view of the electrical connector of FIG. 2.

In one embodiment, as shown in FIG. 1 to FIG. 8, the electrical connector 100 may include an insulating housing 500. Referring to FIG. 3, the insulating housing 500 may be provided with an interfacing surface 501 and a mounting surface 502. The interfacing surface 501 and the mounting surface 502 may be arranged oppositely in the vertical direction Z-Z. The interfacing surface 501 may be provided with a card slot 530. Exemplarily, the card slot 530 may be recessed inwards from the interfacing surface 501 along the vertical direction Z-Z. The card slot 530 may be configured to receive at least part of a electronic card 900. The card slot 530 may be configured to receive the lower edge of an electronic card so as to maintain the position of the electronic card relative to the insulating housing 500. The electronic card may include one or more of a graphics card, a memory card, a sound card and the like. Therefore, the electrical connector 100 may include a card edge connector. The insulating housing 500 may be molded of an insulating material such as plastic. The insulating housing 500 may be an integrated member.

Exemplarily, the insulating housing 500 may be of a longitudinal strip shape. The insulating housing 500 may extend along the longitudinal direction X-X. The card slot 530 may be a slot extending along the longitudinal direction X-X. The electronic card 900 may be inserted into the card slot 530 from the interfacing surface 501. The mounting surface 502 may engage a circuit board which may serve as a mainboard. A plurality of conductive elements 700 may be held by the insulating housing 500. The plurality of conductive elements 700 may be arranged in the insulating housing 500 and spaced apart from one another in the longitudinal direction X-X so as to ensure that the adjacent conductive elements 700 may be electrically insulated from each other. The plurality of conductive elements 700 may be distributed on opposite sides of the card slot 530. The electronic card 900 may be provided with a plurality of matching conductive elements, such as golden fingers. When the electronic card 900 is inserted into the card slot 530, the plurality of conductive elements 700 may be electrically connected to the matching conductive elements on the electronic card 900. The conductive elements 700 may extend out of the mounting surface 502 and be electrically connected to the circuit board. The electronic card 900 may be electrically connected to the circuit board via the electrical connector 100, so that a circuit on the electronic card 900 may be interconnected with a circuit on the circuit board.

Exemplarily, the insulating housing 500 may include a base body 510. The conductive element 700 may be arranged on the base body 510. The base body 510 may include a first base body 511 and a second base body 512 which may be disposed on opposite sides of the card slot 530. The first base body 511 and the second base body 512 may be spaced apart in the transverse direction Y-Y, and the card slot 530 may be formed between the first base body 511 and the second base body 512. That is, both the first base body 511 and the second base body 512 may be provided with the conductive elements 700. The conductive elements 700 on opposite sides may face each other, or may be staggered by a certain distance in the longitudinal direction X-X. The conductive elements 700 on opposite sides may be of a same structure and may be mirror images of each other. Optionally, the conductive element 700 may only be arranged in any one of the first base body 511 and the second base body 512. Optionally, the structures of the conductive elements 700 on opposite base bodies may be different.

The insulating housing 500 may further include a tower 520. The tower 520 may be disposed on an end of the insulating housing 500 in the longitudinal direction X-X. The tower 520 may be connected to an end of the base body 510, the tower 520 may protrude from the interfacing surface 501 along the vertical direction Z-Z. Therefore, the tower 520 may be higher than the base body 510 in the vertical direction Z-Z. The towers 520 may be arranged in pairs. One pair of towers 520 may be connected to two ends of the base body 510 respectively.

In the embodiments shown in the figure, the card slot 530 may extend into the pair of towers 520 from the base body 510. The card slot 530 may include a first groove 531 and a second groove 532. The first groove 531 may be disposed in the base body 510. The first groove 531 may extend along the longitudinal direction X-X. A separating rib 533 may be arranged in the first groove 531. The separating rib 533 may divide the first groove 531 into a plurality of independent sectors. The separating rib 533 may enhance the mechanical strength of the base body 510; moreover, when the separating rib 533 is arranged at the non-center position of the first groove 531, a fool-proofing function may be achieved. The second groove 532 may be formed in each tower 520. One pair of second grooves 532 may be respectively disposed on side surfaces of the pair of towers 520 facing each other; and the pair of second grooves 532 may extend along the vertical direction Z-Z. The lower portions of the pair of second grooves 532 are connected to two ends of the first groove 531 respectively. In this way, the card slot 530 may be U-shaped.

Exemplarily, the electrical connector 100 may further include a pair of latches 600. The latches 600 may be connected to the base body 510. The base body 510 may be provided with a base body recess 590. The base body recess 590 may be disposed on an outer side of the second groove 532. The base body recess 590 may communicate with the second groove 532. The base body recess 590 may be disposed at the lower portion of the tower 520. The lower end of each of the latches 600 may be in the base body recess 590 and pivotally connected to the base body 510 between an unlocked position and a locked position.

In FIG. 1, the latch 600 is disposed at the locked position, and the upper portion of the latch 600 may be buckled on the tower 520. The latch 600 may lock and connect the electronic card 900 to the electrical connector 100. In FIG. 2, the latch 600 is disposed at the unlocked position, and the upper portion of the latch 600 may be separated from the tower 520. The latch 600 may lock the electronic card 900 into the card slot 530, or may unlock the electronic card 900 so as to enable the electronic card 900 to be removed from the insulating housing 500.

Figure 4:
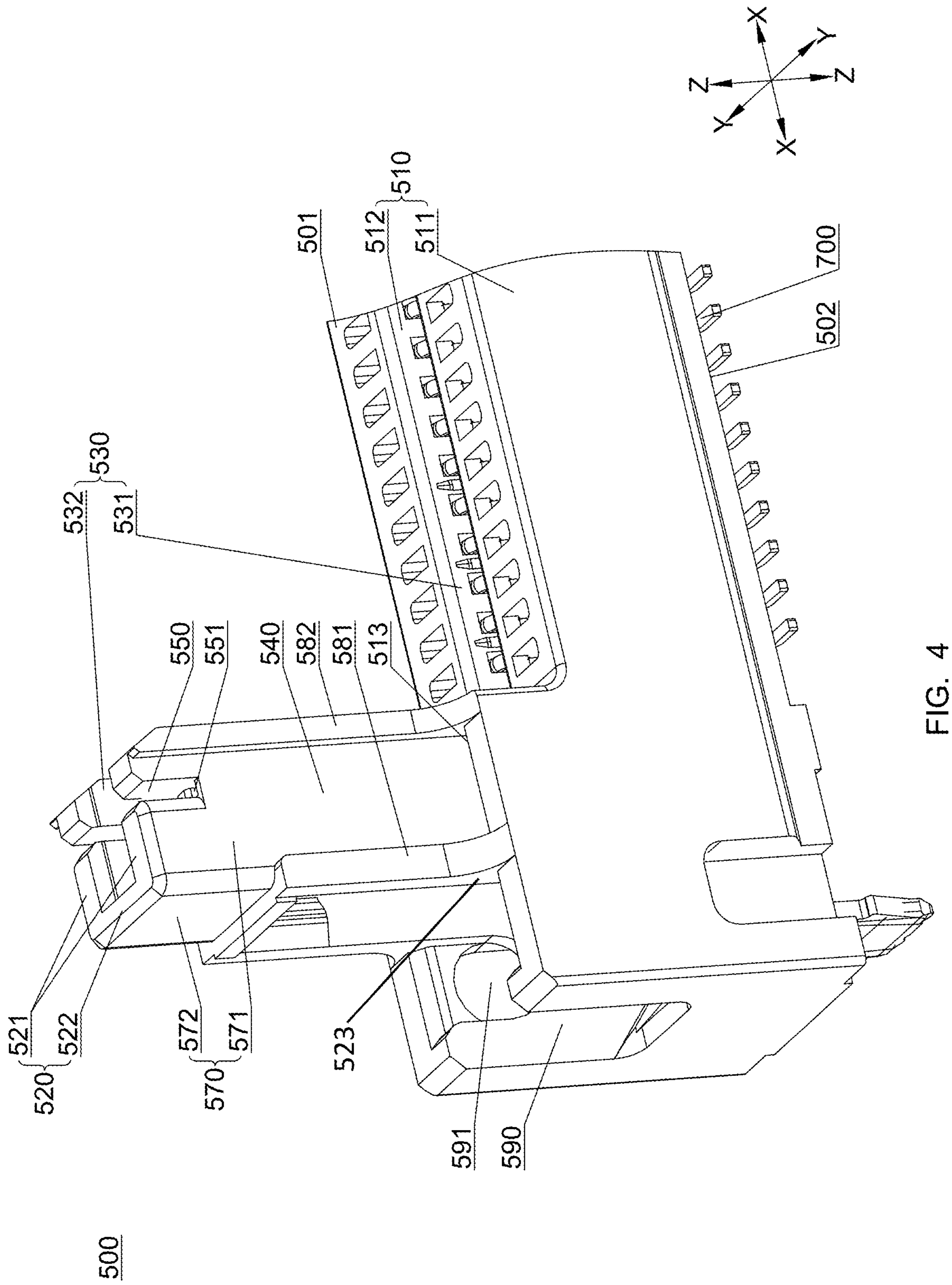
FIG. 4 is a perspective view of a portion of an insulating housing of the electrical connector of FIG. 3.
Figure 5:
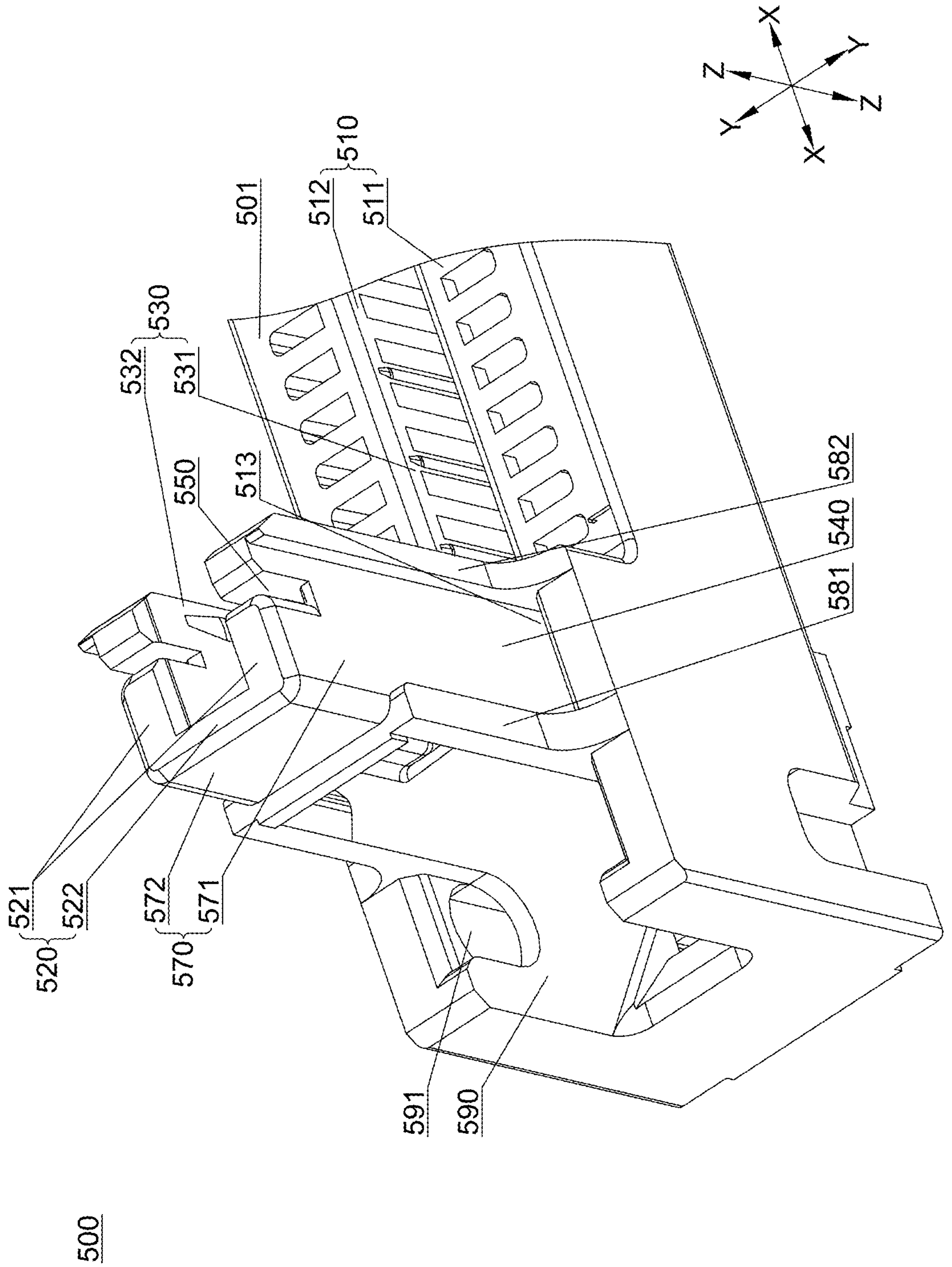
FIG. 5 is a perspective view of the portion of the insulating housing of FIG. 4.
Figure 6:
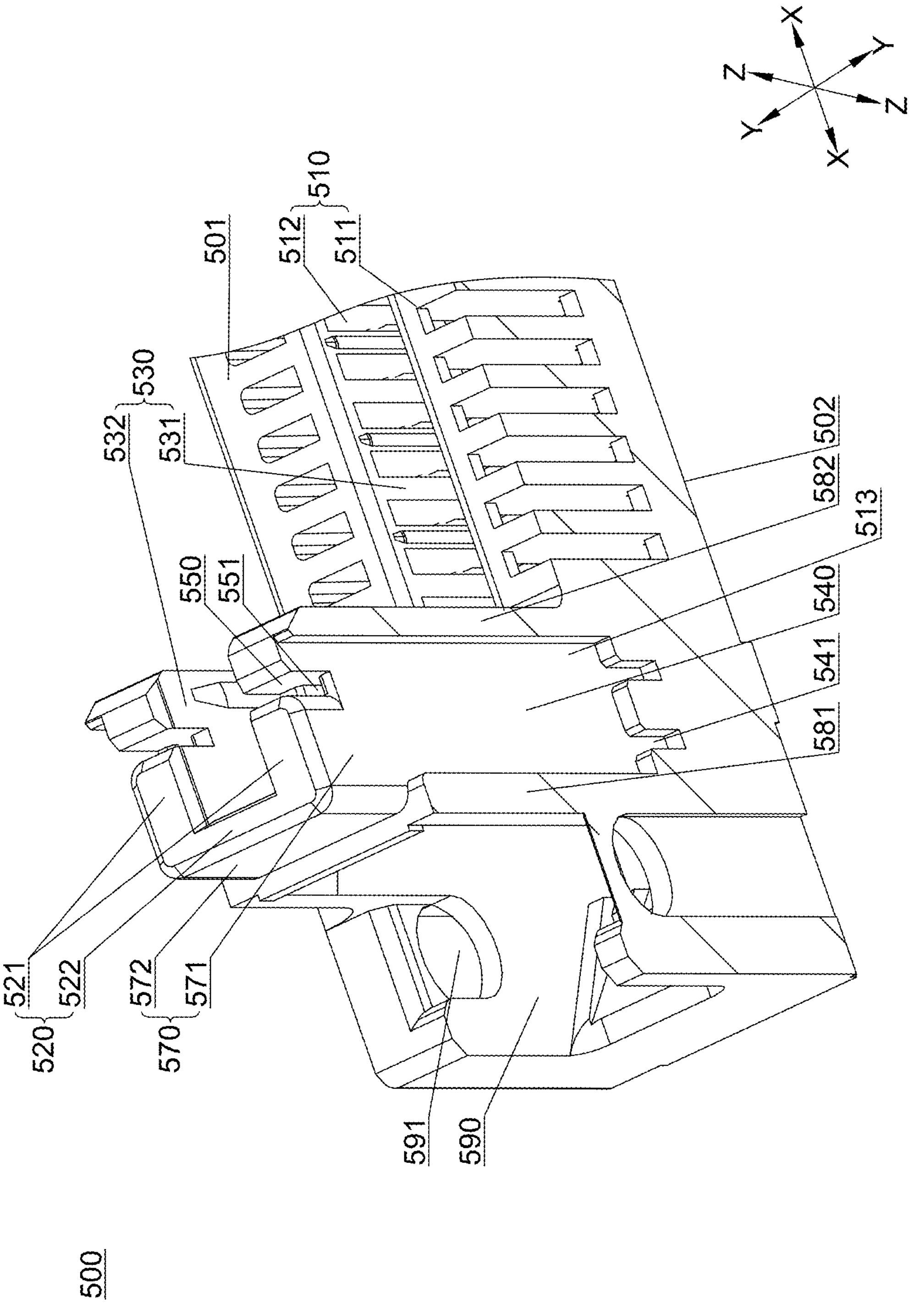
FIG. 6 is a cross-sectional perspective view of the portion of the insulating housing of FIG. 5.
Figure 7:
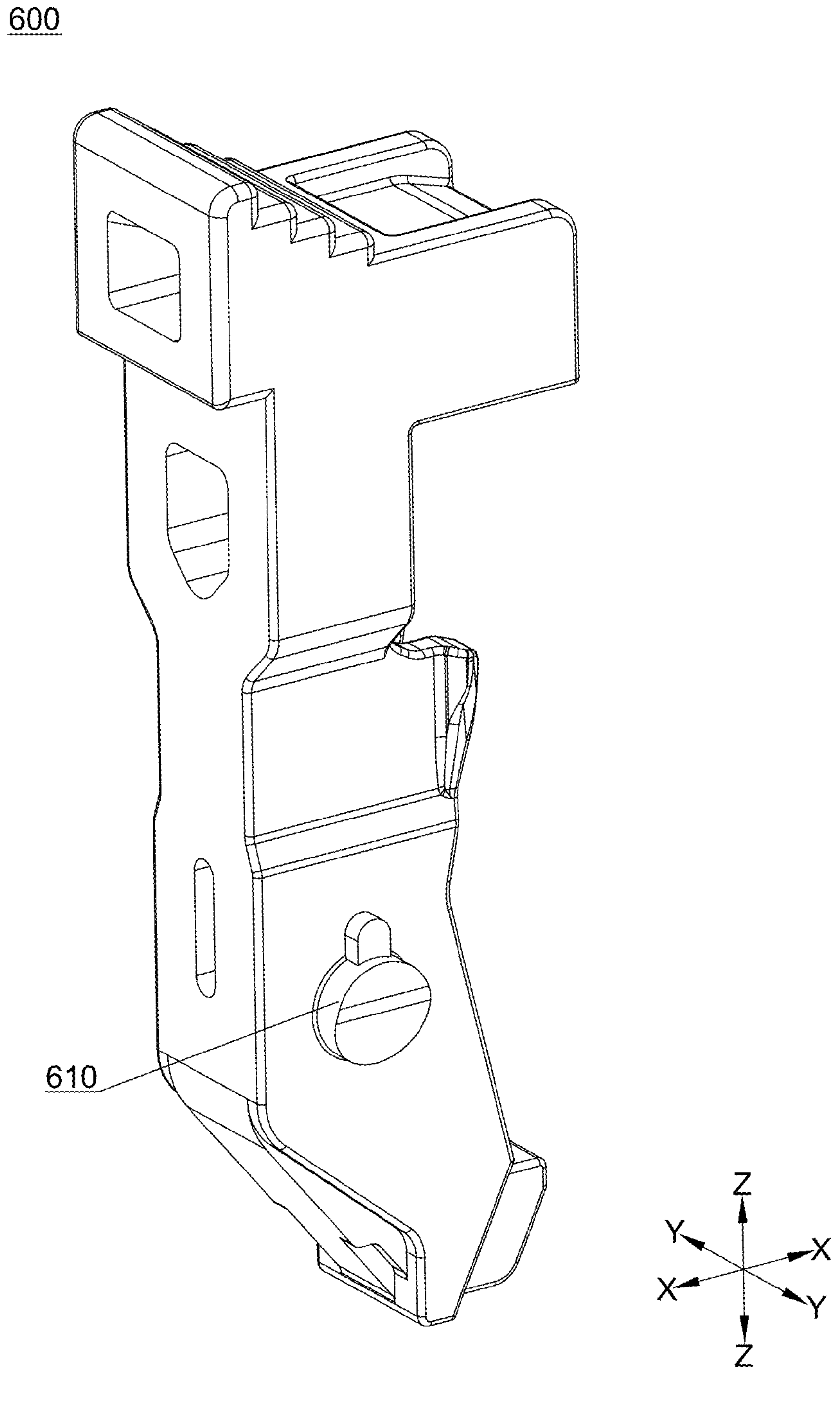
FIG. 7 is a perspective view of a latch of the electrical connector of FIG. 3.
Figure 8:
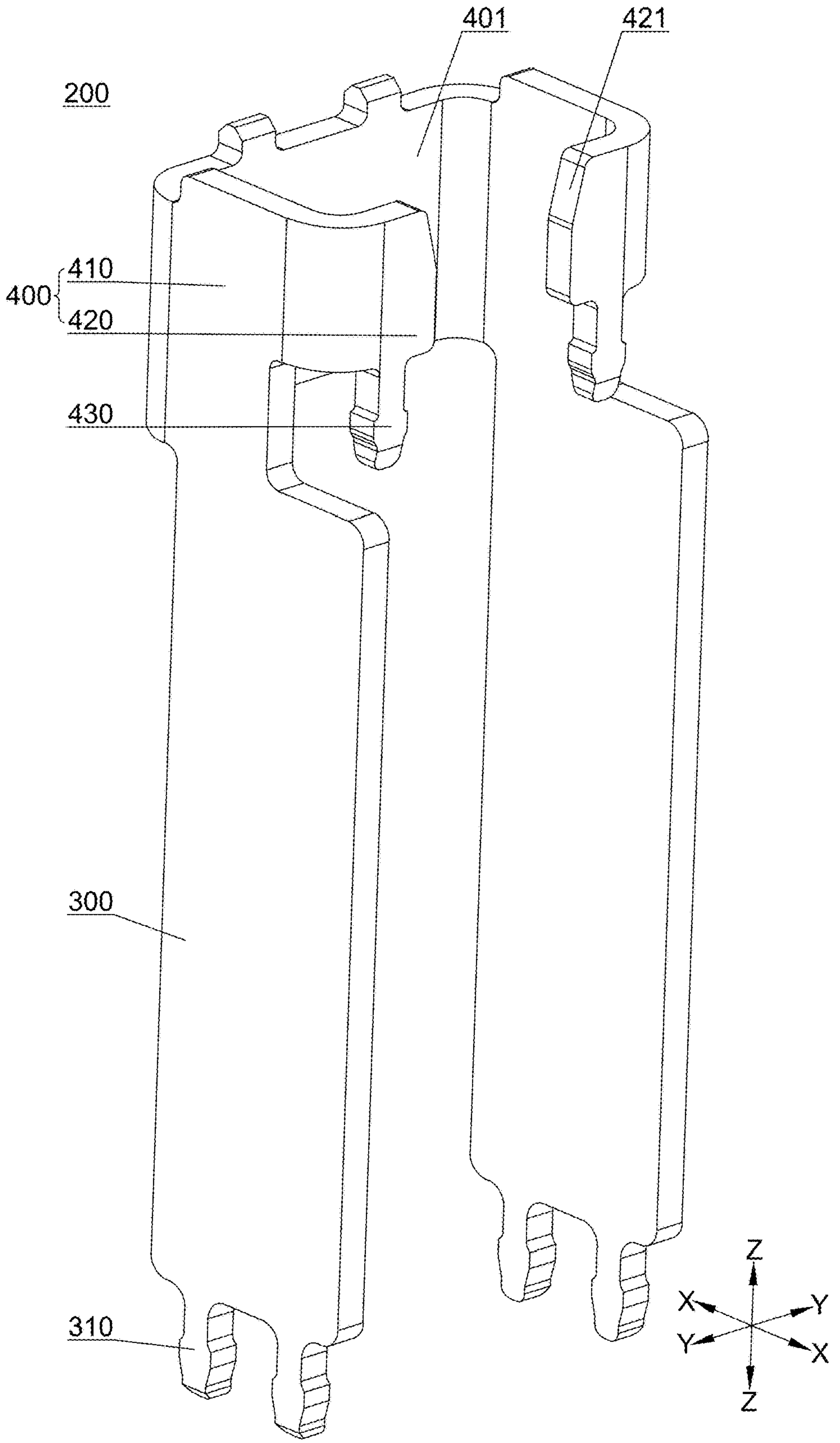
FIG. 8 is a perspective view of a reinforcing member of the electrical connector of FIG. 3.

As illustrated, the latch 600 may be provided with a pivot 610 (referring to FIG. 7), and a side wall of the base body recess 590 may be provided with a pivoting hole 591 (referring to FIG. 4 to FIG. 6). The pivot 610 may be inserted into the pivoting hole 591, so that the latch 600 may pivot relative to the insulating housing 500.

Exemplarily, the latches 600 may be arranged in pairs. The latches 600 arranged in pairs may be connected to two ends of the base body 510 respectively. Each of the latches 600 may be molded of an insulating material such as plastic. The latches 600 may be integrated members. The latches 600 and the insulating housing 500 may be made of the same or different materials.

The electrical connector 100 may further include a reinforcing member 200. The reinforcing member 200 may be arranged on the insulating housing 500.

The reinforcing member 200 may include a first reinforcing member portion 300. The first reinforcing member portion 300 may be made of a high-strength material such as plastic, ceramic, metal and so on. Preferably, the first reinforcing member portion 300 may be made of a metal material. The metal material may have higher strength and lower in material and processing costs. When the first reinforcing member portion 300 is an integrated sheet metal piece, the first reinforcing member portion 300 may have higher mechanical strength, a simpler processing process and lower cost.

The first reinforcing member portion 300 may extend along the vertical direction Z-Z. One part of the first reinforcing member portion 300 may be inserted into the base body 510. The other part of the first reinforcing member portion 300 may be supported on the tower 520 so as to enhance the mechanical strength of the tower 520. Based on the orientation of the embodiment shown in FIG. 3, the lower portion of the first reinforcing member portion 300 is inserted into the base body 510 and the upper portion thereof is supported on the tower 520, so that the mechanical strength of the tower 520 may be enhanced, and the strength of the joint 523 between the tower 520 and the base body 510 may also be enhanced, thereby reducing the risk of the tower 520 being deformed relative to the base body 510 or even being cracked.

Optionally, the first reinforcing member portions 300 may only be arranged at an end of the insulating housing 500, that is, the first reinforcing member portions 300 may be only arranged in an end of the base body 510 and the corresponding tower 520. Optionally, the first reinforcing member portions 300 may be arranged at both ends of the insulating housing 500, that is, the first reinforcing member portions 300 may be arranged in both ends of the base body 510 and the corresponding towers 520. reinforcing member portion insulating housing The arrangement of the card slot 530 can reduce the mechanical strengths of the base body 510 and the tower 520, particularly under the tendency of production miniaturization. The first reinforcing member portion 300 can play a role in enhancing the base body 510 and the tower 520, thereby improving the impact resistance. In particular, the first reinforcing member portion 300 can strengthen the joint 523 between the base body 510 and the tower 520, so that the impact resistance of the joint can be greatly improved. In addition, since the tower 520 protrudes out of the base body 510 in the vertical direction, the tower 520 with the increased strength can effectively share the impact force on the based body 510, enhance the pair of base bodies 510, and improve the impact resistance of the base bodies 510. In particular, it can improve the resistance to the impact force in the transverse direction Y-Y, so that the insulating housing 500 can be protected to a certain extent, and deformation or even cracking of the insulating housing 500 can be avoided.

Exemplarily, a transverse width of the tower 520 may be less than a transverse width of the base body 510. The electrical connector 100 and the electronic card 900 generate heat during work. In this arrangement, even if a plurality of electrical connectors 100 are closely arranged to each other in the transverse direction Y-Y, there may be a gap(s) between the towers 520 of the adjacent electrical connectors 100; therefore, an air circulation channel may be formed herein, so that a better heat dissipation effect can be achieved. In this way, the performance of the electrical connector 100 is more stable. The electrical connector 100 is particularly suitable for the scenario with poor ventilation atmosphere, the scenario where the electrical connector 100 works for a long time and/or the scenario where the electrical connector 100 generates a larger amount of heat.

When the transverse width of the tower 520 is less than that of the base body 510, the mechanical strength of the joint 523 between the base body 510 and the tower 520, and the mechanical strength of the tower 520 may be reduced. The first reinforcing member portion 300 may play a role in enhancing the mechanical strength of the joint 523 between the base body 510 and the tower 520 and the mechanical strength of the tower 520, thereby improving the impact resistance.

Exemplarily, taking the card edge connector as an example, a longitudinal length of the whole card slot 530 is obviously greater than the transverse width thereof. When subjected to an impact force in the transverse direction Y-Y, the joint 523 between the base body 510 and the tower 520 is easily deformed or even cracked. Therefore, further, the first reinforcing member portion 300 may be disposed on a side surface of the card slot 530. The side surface of the card slot 530 refers to any one side or opposite sides of the card slot 530 opposite to each other in the transverse direction Y-Y. In this way, when the electronic card 900 is inserted into the card slot 530, in the transverse direction Y-Y, the first reinforcing member portion 300 can maintain the shapes of the base body 510 and the tower 520 from the side of the electronic card 900, thereby avoiding deformation or even cracking of the base body 510 and the tower 520 when the electronic card 900 is impacted by an external force.

Exemplarily, the first reinforcing member portions 300 may be arranged in pairs. The first reinforcing member portions 300 arranged in pairs may be spaced apart in the transverse direction Y-Y. The first reinforcing member portions 300 arranged in pairs may be respectively disposed on opposite sides of the card slot 530 oppositely. In this arrangement, when the electronic card 900 is inserted into the card slot 530, in the transverse direction Y-Y, the first reinforcing member portion 300 can maintain the shapes of the base body 510 and the tower 520 from opposite sides of the electronic card 900, thereby avoiding deformation or even cracking of the base body 510 and the tower 520 when the electronic card 900 is impacted by an external force.

Exemplarily, the tower 520 may include an end wall 522 and a pair of side walls 521. The pair of side walls 521 may be disposed on opposite sides of the card slot 530 in the transverse direction Y-Y. The end wall 522 may be connected between the pair of side walls 521. A section formed by the end wall 522 and the pair of side walls 521 may be of a U shape. The section is formed by sectioning the tower 520 by a plane perpendicular to the vertical direction Z-Z. An opening of the U shape may surround the end of the card slot 530. The other part of the first reinforcing member portion 300 may be supported in at least one side wall 521. In this arrangement, the tower 520 has a simpler structure and lower manufacturing cost.

Exemplarily, the first reinforcing member portion 300 may also not be disposed on a side surface of the card slot 530, but may be disposed on an outer side of the card slot 530 in the longitudinal direction X-X. For example, the first reinforcing member portion 300 may be arranged in the end wall 522 or abut against an outer side or an inner side of the end wall 522. However, since the latch 600 is disposed at the end wall of the card slot 530, this arrangement increases the manufacturing difficulty.

Exemplarily, one part of the first reinforcing member portion 300 may be inserted into the base body 510, and the other part of the first reinforcing member portion 300 may abut against an outer side surface (that is, an outer side surface of the side wall 521) of the tower 520 in the longitudinal direction X-X. In this arrangement, the first reinforcing member portion 300 is convenient to be mounted. Furthermore, it is unnecessary to change the structure of the tower 520, so that the workload of design may be reduced. In other embodiments, the other part of the first reinforcing member portion 300 may also be inserted into the tower 520. Exemplarily, the first reinforcing member portion 300 may be embedded into the insulating housing 500 by overmolding. The insulating housing 500 and the first reinforcing member portion 300 may be manufactured separately, and assembled together in a plug-in manner.

Exemplarily, the first reinforcing member portion 300 may be disposed on an outer side of the base body recess 590 in the transverse direction Y-Y. Along the vertical direction Z-Z, the first reinforcing member portion 300 may extend toward the mounting surface 502 to the base body recess 590, even may extend below the base body recess 590. The base body recess 590 may affect the strength of the base body 510, and the first reinforcing member portion 300 may improve the mechanical strength of the base body 510, so as to reduce the risk of the base body 510 being deformed or even cracked.

Exemplarily, the insulating housing 500 may also be provided with a first recess 540, as shown in FIG. 4 to FIG. 6. The first recess 540 may extend into the base body 510 from the outer side surface (that is, the side surface where a first protruded block 581 and a second protruded block 582 to be described later are disposed) of the tower 520 extending along the longitudinal direction X-X. The first recess 540 may include a groove 513 in the base body 510, as shown in FIG. 4 to FIG. 6. An opening of the groove 513 and the interfacing surface 501 may face the same direction. The first reinforcing member portion 300 may be arranged in the first recess 540. By providing the first recess 540, the first reinforcing member portion 300 may be positioned to ensure that the first reinforcing member portion 300 is disposed at an expected position. Moreover, the structural size of the electrical connector 100 may be reduced, and the electrical connector 100 is more exquisite and compact.

Exemplarily, the first recess 540 may extend to a top of the tower 520. The first reinforcing member portion 300 may be inserted into the first recess 540 from a position above the tower 520 along the vertical direction Z-Z. In this arrangement, the first recess 540 is easy to process and has lower manufacturing cost. Moreover, the top of the tower 520 is disposed on the side convenient to operate; therefore, by this arrangement, the first reinforcing member portion 300 is easier to assemble, and the production cost of the electrical connector 100 is low. In this way, the insulating housing 500 and the first reinforcing member portion 300 may be assembled after being separately manufactured, thereby facilitating production, manufacturing and installation, and reducing the cost of the electrical connector 100. In addition, the size of the first reinforcing member portion 300 in the vertical direction Z-Z may be extended as much as possible, so that the base body 510 and the tower 520 can be protected to a greater extent, and deformation or event cracking of the insulating housing 500 can be avoided.

Exemplarily, the first reinforcing member portion 300 may be of a sheet shape. The first reinforcing member portion 300 may extend along the longitudinal direction X-X. In this arrangement, the size of the first reinforcing member portion 300 in the longitudinal direction X-X is larger, so that a longer protection distance may be provided to the base body 510 and the tower 520.

Exemplarily, a plurality of extending recess 541 may extend from the bottom of the groove 513 toward the mounting surface 502. The plurality of extending recesses 541 may be spaced apart in the longitudinal direction X-X. The first reinforcing member portion 300 may has a plurality of first reinforcing member portion tabs 310 extending toward the mounting surface 502. The plurality of first reinforcing member portion tabs 310 may be clamped into the plurality of extending recesses 541 in a one-to-one correspondence manner. Exemplarily, the plurality of first reinforcing member portion tabs 310 may be clamped into the plurality of extending recess 541 in an interference fit manner. With this arrangement, the first reinforcing member portion 300 may be fixed. Furthermore, the size of the first reinforcing member portion 300 in the vertical direction Z-Z may be extended as much as possible, so that the base body 510 and the tower 520 can be protected to a greater extent, and deformation or even cracking of the insulating housing 500 can be avoided. Furthermore, compared with the structure in which the bottom of the groove 513 directly extends toward the mounting surface 502, the plurality of extending recesses 541 may reduce the hollowing out of the base body 510, so that the mechanical strength of the base body 510 may be improved, and when the insulating housing 500 is transported and mounted, the insulating housing 500 would not be deformed or cracked.

Exemplarily, the reinforcing member 100 may further include a second reinforcing member portion 400. The second reinforcing member portion 400 may be made of a high-strength material such as plastic, ceramic, metal and so on. Preferably, the second reinforcing member portion 400 may be made of a metal material. The metal material has higher strength and lower in material and processing costs, when the second reinforcing member portion 400 is an integrated sheet metal piece, the second reinforcing member portion 400 has higher mechanical strength, a simpler processing process and lower cost. The second reinforcing member portion 400 and the first reinforcing member portion 300 may be made of the same or different materials.

The second reinforcing member portion 400 may be arranged on the tower 520 by any manners such as bonding or clamping. Optionally, the second reinforcing member portion 400 may be molded in the tower 520 of the insulating housing 500 by means of overmolding. However, this may cause higher processing cost of the insulating housing 500. The second reinforcing member portion 400 may be provided with an opening 401. Optionally, the cross section of the second reinforcing member portion 400 may be of a U shape or V shape. The cross section is formed by sectioning the second reinforcing member portion 400 by a plane perpendicular to the vertical direction Z-Z. The end of the card slot 530 may extend into the opening 401.

The second reinforcing member portion 400 is arranged in the tower 520, so that the tower 520 may be enhanced and the impact resistance thereof may be improved. Under the impact force in the transverse direction Y-Y, the tower 520 is easy to be deformed or even cracked. The end of the card slot 530 extends into the opening 401 of the second reinforcing member portion 400. When the electronic card 900 is inserted into the card slot 530, in the longitudinal direction X-X, the second reinforcing member portion 400 can maintain the shape of the tower 520 from opposite sides of the electronic card 900, so that it may be avoided that the tower 520 is deformatted or cracked when the electronic card is impacted by an external force. In addition, since a vertical height of the tower 520 may be greater than a vertical height of the base body 510, the tower 520 with the increased strength can effectively share the impact force on the base body 510, and improve the impact resistance, so that the insulating housing 500 may be protected to a certain extent, and deformation or cracking of the insulating housing 500 can be avoided.

Optionally, the second reinforcing member portion 400 may be arranged on only one tower 520. Optionally, the second reinforcing member portions 400 may be arranged on both towers 520. reinforcing member portion The two reinforcing member portions 400 may surround two ends of the card slot 530 respectively.

Exemplarily, the second reinforcing member portion 400 may be disposed on the side, away from the base body 510, of the first reinforcing member portion 300. For the embodiments shown in the figures, the second reinforcing member portion 400 may be arranged above the first reinforcing member portion 300. Since the side, away from the base body 510, of the tower 520 is also prone to deformation or even cracking, the second reinforcing member portion 400 is arranged here, so that the deformation or even cracking may be effectively inhibited. Moreover, such arrangement of the second reinforcing member portion 400 and the first reinforcing member portion 300 in this order can fully utilize the space on the insulating housing 500.

Exemplarily, the first reinforcing member portion 300 and the second reinforcing member portion 400 may be formed as an integral piece, or integrated by any appropriate manner such as welding, bonding, molding, machining and so on. Exemplarily, the first reinforcing member portion 300 may be connected to a side surface, extending along the longitudinal direction X-X, of a reinforcing body 410 (which will be described below in detail) of the second reinforcing member portion 400. In this arrangement, the mounting process can be reduced, and the production efficiency can be improved.

Figure 9:
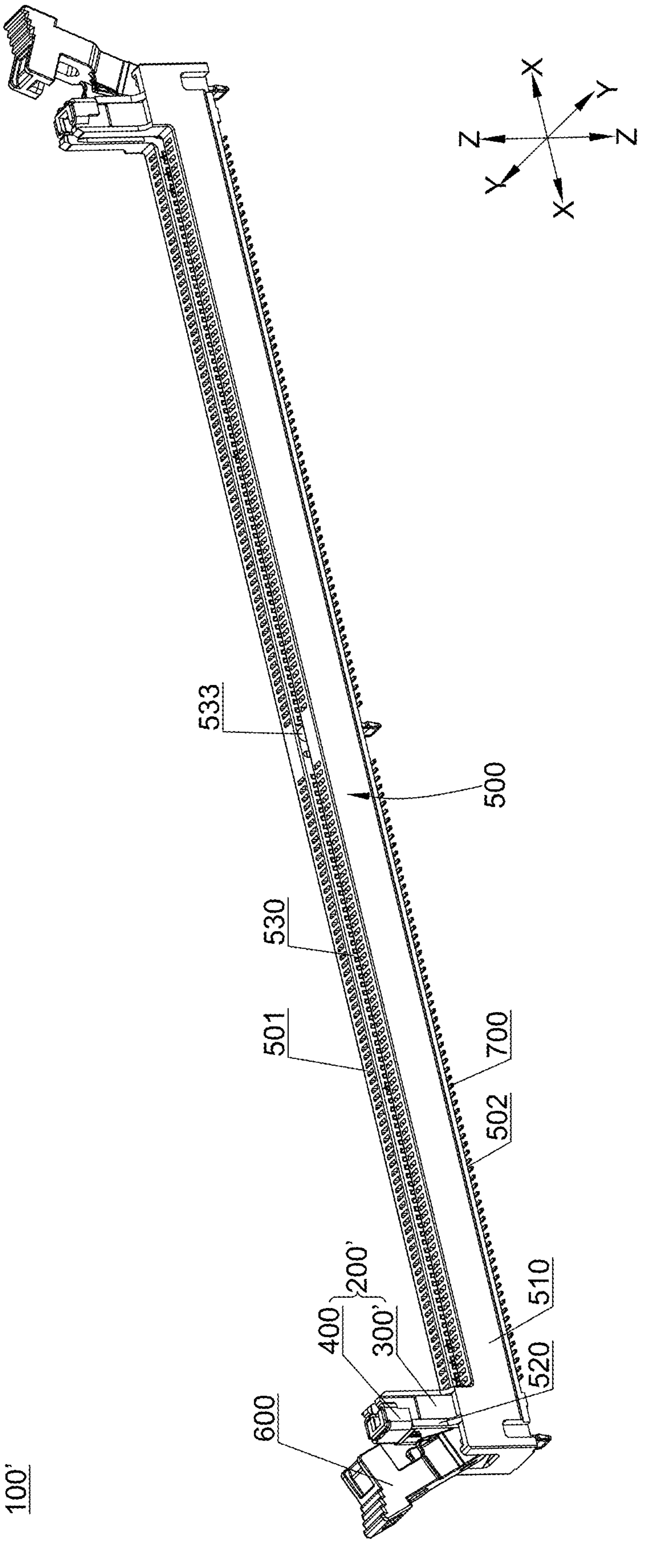
FIG. 9 is a perspective view of an electrical connector, according to some embodiments.
Figure 10:
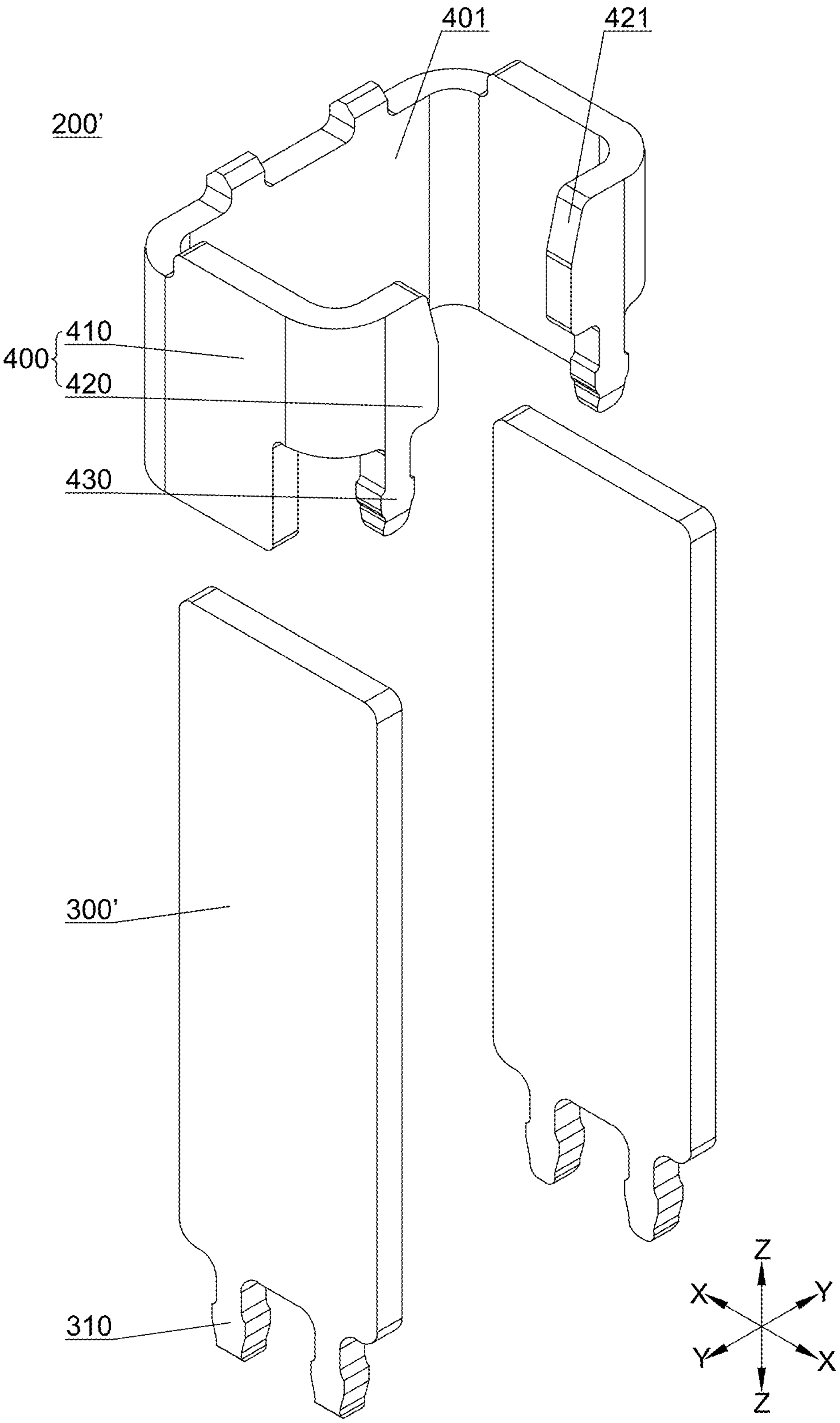
FIG. 10 is a perspective view of a reinforcing member of the electrical connector of FIG. 9.
Figure 11:
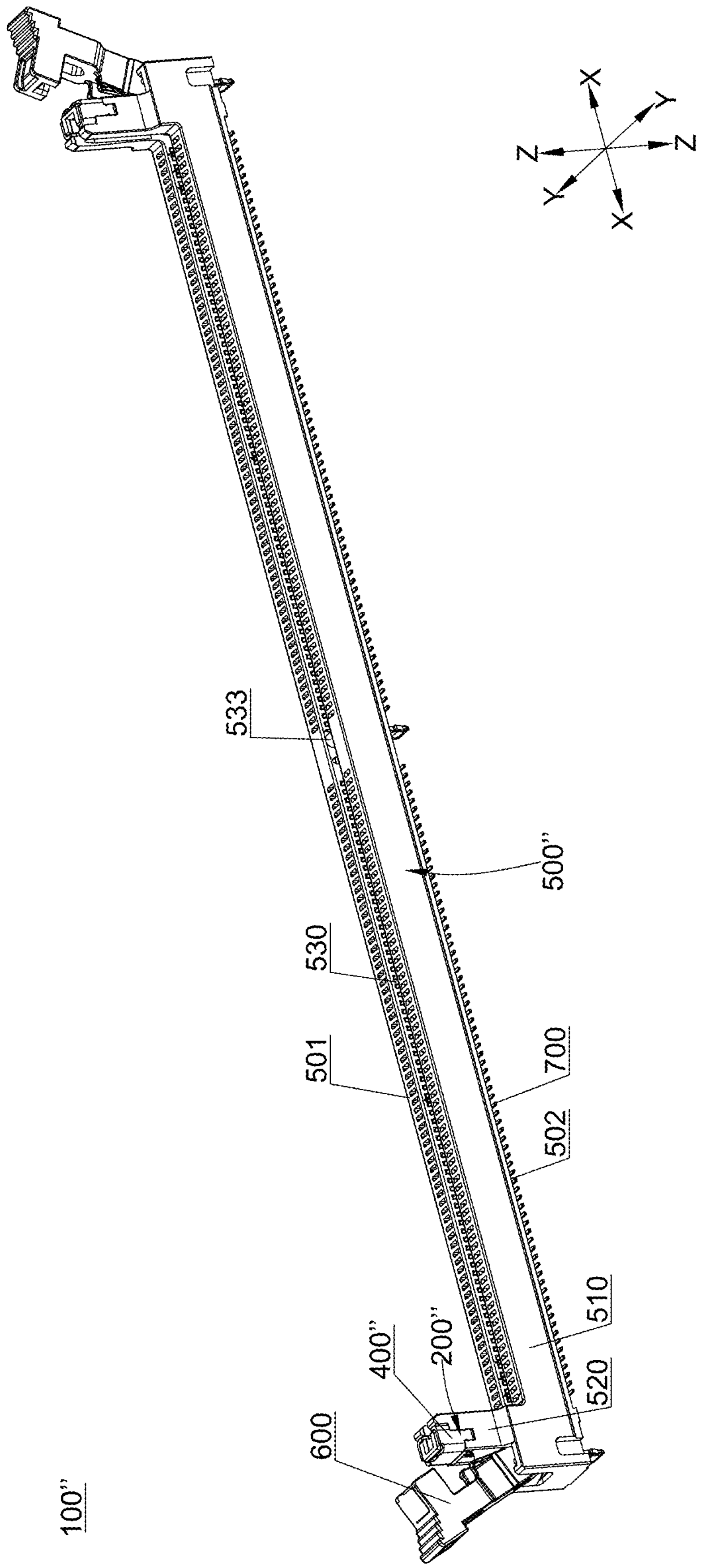
FIG. 11 is a perspective view of an electrical connector, according to some embodiments.
Figure 12:
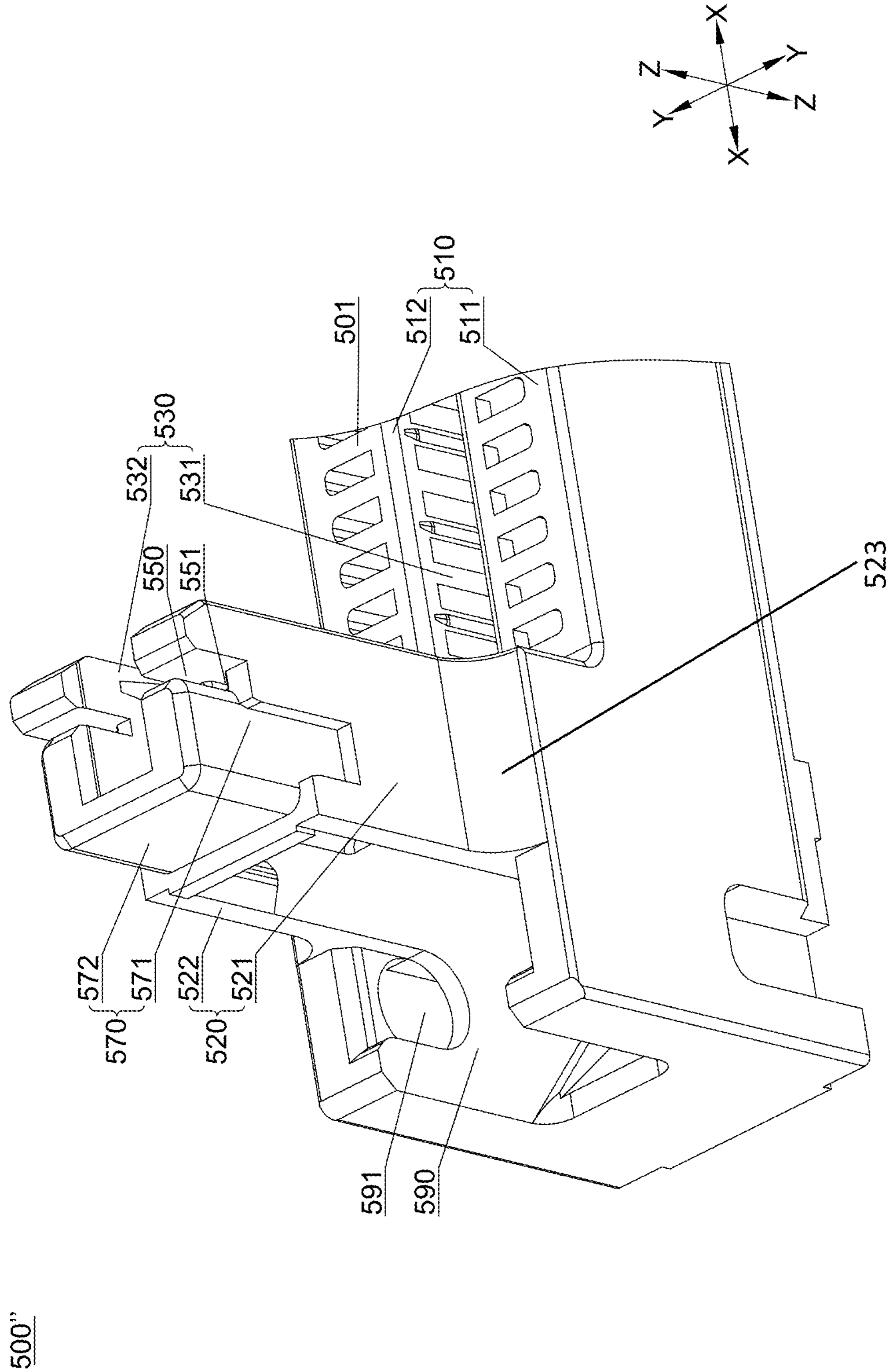
FIG. 12 is a perspective view of a portion of an insulating housing of the electrical connector of FIG. 11.
Figure 13:
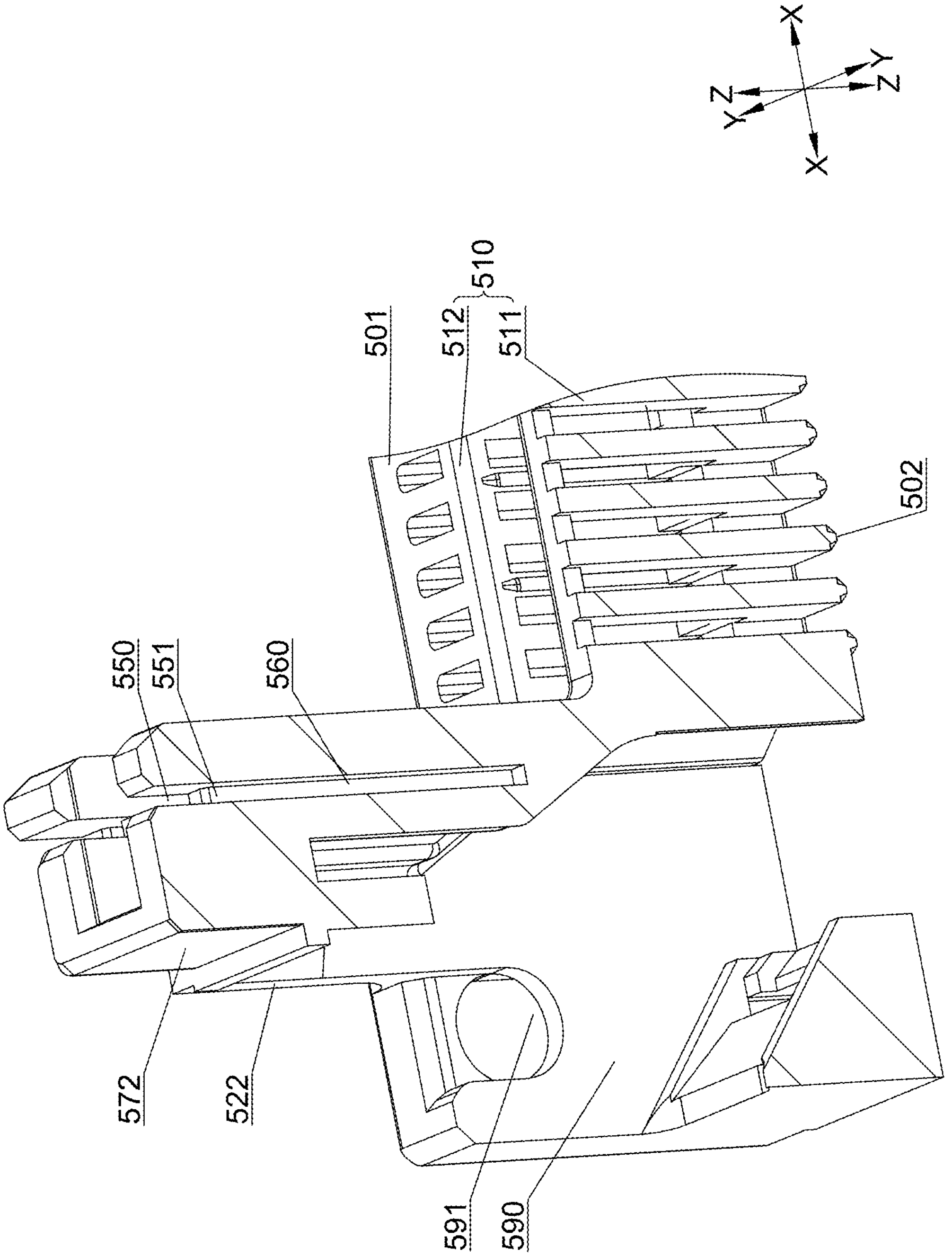
FIG. 13 is a cross-sectional view of the portion of the insulating housing of the electrical connector of FIG. 12.
Figure 14:
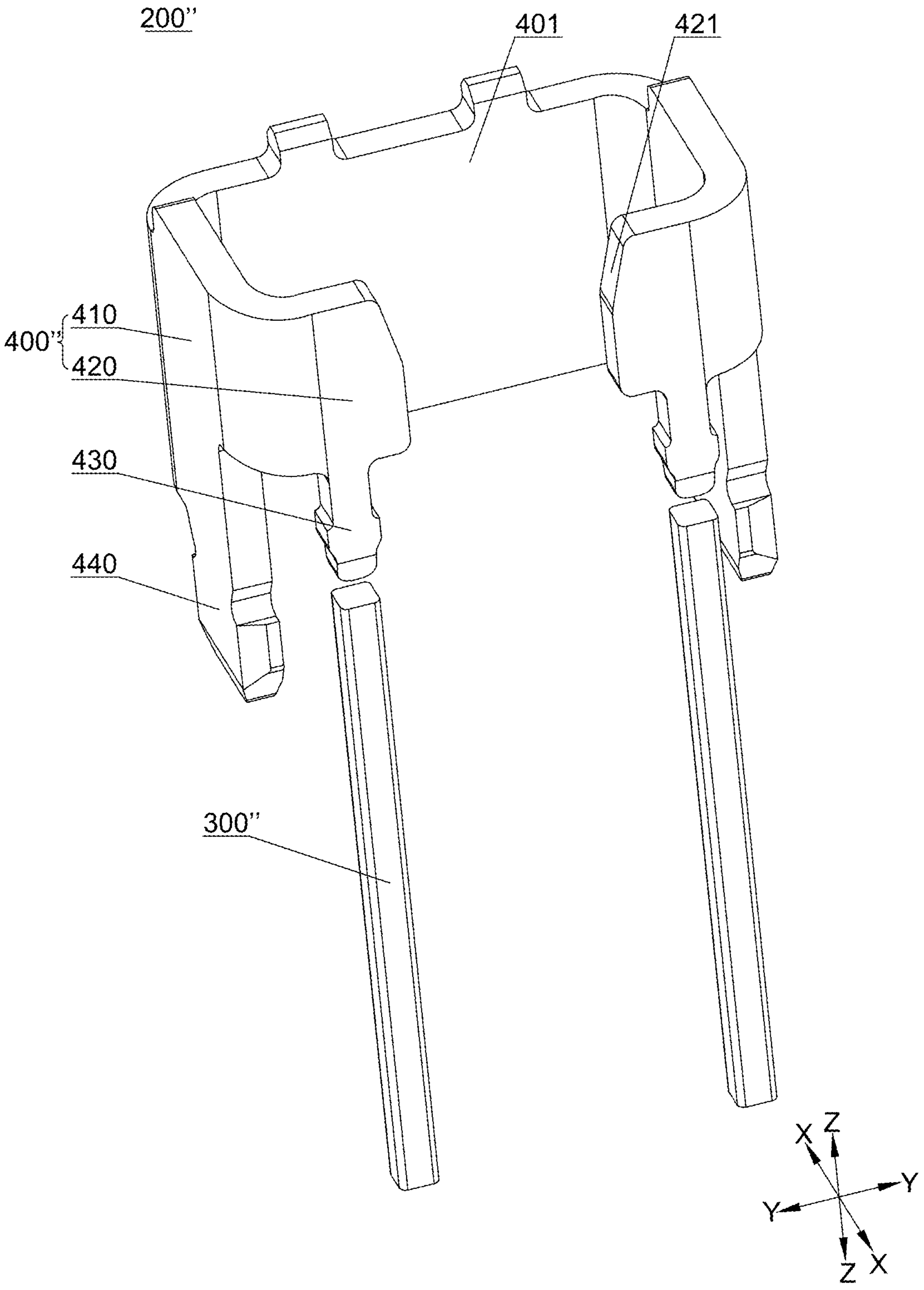
FIG. 14 is a perspective view of a reinforcing member of the electrical connector of FIG. 11.

In another embodiment, in the electrical connector 100' shown in FIG. 9 and FIG. 10, a first reinforcing member portion 300' and a second reinforcing member portion 400 of a reinforcing member 200' may be separate. Exemplarily, the first reinforcing member portion 300' may be separate from a side surface of the reinforcing body 410 of the second reinforcing member portion 400 extending along the longitudinal direction X-X. In this way, manufacturing is facilitated.

Exemplarily, referring to FIG. 4 to FIG. 6, the tower 520 may be provided with a third recess 570. The third recess 570 may extend to a top of the tower 520. The second reinforcing member portion 400 may be inserted into the third recess 570 from a position above the tower 520 along the vertical direction Z-Z. By providing the third recess 570, the second reinforcing member portion 400 can be positioned to ensure that the second reinforcing member portion 400 is disposed at an expected position. Moreover, the structural size of the electrical connector 100 can be reduced, and the electrical connector 100 is exquisite and compact. In this arrangement, the first recess 540 is convenient to process and has low manufacturing cost. Moreover, the top of the tower 520 is disposed on the side convenient to operate; therefore, by this arrangement, the second reinforcing member portion 400 is easier to assemble, and the production cost of the electrical connector 100 is low. In this way, the insulating housing 500 and the second reinforcing member portion 400 may be assembled after being separately manufactured, thereby facilitating production, manufacturing and mounting, and reducing the cost of the electrical connector 100. In addition, the size of the second reinforcing member portion 400 in the vertical direction Z-Z may be extended as much as possible, so that the base body 510 can be protected to a great extent, and deformation or even cracking of the base 510 can be avoided.

Exemplarily, the first reinforcing member portion 300 may be mounted to the insulating housing 500 through the third recess 570. The top of the tower 520 is disposed on the side convenient to operate, so by this arrangement, the first reinforcing member portion 300 is easier to assembly, and the production cost of the electrical connector 100 is low. In this way, the insulating housing 500 and the first reinforcing member portion 300 may be assembled after being separately manufactured, thereby facilitating production, manufacturing and mounting, and reducing the cost of the electrical connector 100. In addition, the size of the first reinforcing member portion 300 in the vertical direction Z-Z may be extended as much as possible, so that the base body 510 and the tower 520 can be protected to a great extent, and deformation or event cracking of the insulating housing 500 may be avoided.

Exemplarily, the third recess 570 may include an end recess 572 and a pair of side recesses 571. The pair of side recesses 571 may be disposed on one pair of side walls 521 respectively. The pair of side recesses 571 may be disposed on opposite sides of the card slot 530 in the transverse direction Y-Y. The end recess 572 may be disposed on the end wall 522. The end recess 572 may be connected between the pair of side recesses 571. A section formed by the end recess 572 and the pair of side recesses 571 may be of a U shape. The section is formed by sectioning the third recess 570 by a plane perpendicular to the vertical direction Z-Z. An opening of the U shape may surround the end of the card slot 530. In this arrangement, the second reinforcing member portion 400 may wrap three side surfaces of the tower 520 from the outer side of the tower 520, and may play a role in reinforcing the tower 520 in the longitudinal direction X-X and the transverse direction Y-Y.

Exemplarily, one end of the first recess 540 may communicate with the side recesses 571 on the side walls 521 where the first recess 540 is disposed. The other end of the first recess 540 may extend into the base body 510. The first reinforcing member portion 300 may be inserted into the first recess 540 through the third recess 570. In this arrangement, the first recess 540 and the third recess 570 are easy to be integrated, so that the production efficiency can be improved. Furthermore, the first reinforcing member portion 300 and the second reinforcing member portion 400 may be directly inserted after being integrated.

Exemplarily, a first protruded block 581 may be arranged on the side wall 521 where the first recess 540 is disposed. The first protruded block 581 may extend to the end wall 522 along the longitudinal direction X-X. Moreover, the first protruded block 581 may be disposed below the side recess 571 on the side wall 521 where the first protruded block 581 is disposed. The first protruded block 581 may form a first side wall of the first recess 540. In this arrangement, the structure of the first protruded block 581 below the side recess 571 may form a step. The step may be configured to support the second reinforcing member portion 400 so as to play a role in fixing the second reinforcing member portion 400.

Exemplarily, a second protruded block 582 may be arranged on the side wall 521 where the first recess 540 is disposed. One end of the second protruded block 582 may extend to the top of the tower 520. The other end of the second protruded block 582 may extend to the base body 510. The second protruded block 582 may form a second side wall of the first recess 540. In this way, the first recess 540 has a simple structure and low manufacturing cost.

Exemplarily, an opening groove 550 may be arranged on the top of tower in one or two of one pair of side walls 521. The opening groove 550 may penetrate through the side wall 521 along the transverse direction Y-Y. The opening groove 550 and the side recesses 571 on the side wall 521 where the opening groove 550 is disposed may be adjacent to and communicate with each other along the transverse direction Y-Y. The second reinforcing member portion 400 may include a reinforcing body 410 and an barb 420. The reinforcing body 410 may be of a U shape. The opening 401 of the U shape may face the card slot 530. The barb 420 may extend from the edge of the opening 401 of the U shape toward the inner side of the opening 401 of the U shape. The barb 420 may be arranged in the opening groove 550. By this arrangement, the second reinforcing member portion 400 may form a structure surrounding the tower 520, so that the strength of the tower 520 may be further enhanced, and the impact resistance thereof may be improved.

Exemplarily, a chamfer 421 may be arranged at the top of the barb 420. The chamfer 421 may play a guiding role. When the electronic card 900 is inserted into the card slot 530 along the vertical direction Z-Z, the chamfer 421 may reduce the risk of the electronic card 900 being scratched and ensure that the electronic card 900 is inserted into the card slot 530.

Exemplarily, an extending opening groove 551 may be arranged at the bottom of the opening groove 550. The barb 420 may be provided with a second reinforcing member portion tab 430. The second reinforcing member portion tab 430 may be clamped into the extending opening groove 551. By this arrangement, the second reinforcing member portion 400 may be fixed. Furthermore, the size of the second reinforcing member portion 400 in the vertical direction Z-Z may be extended as much as possible, so that the tower 520 can be protected to a greater extent, and deformation or cracking of the insulating housing 500 can be avoided.

In another embodiment, as shown in FIG. 11 to FIG. 14, a second recess 560 may be formed in the side wall 521 where the opening groove 550 is disposed. The second recess 560 may extend along the vertical direction Z-Z. One end of the second recess 560 may communicate with the opening groove 550. The other end of the second recess 560 may extend into the base body 510. The first reinforcing member portion 300" of the reinforcing member 200" may be inserted into the second recess 560 through the opening groove 550. By providing the second recess 560, the first reinforcing member portion 300" may be positioned, so that the first reinforcing member portion 300" may be fixed. Furthermore, the second recess 560 and the third recess 570 are convenient for integrated processing and molding, so that the production efficiency can be improved. Furthermore, the first reinforcing member portion 300" and the second reinforcing member portion 400" may be integrated and directly inserted.

Optionally, the first reinforcing member portion 300" may be connected to the second reinforcing member portion tab 430 of the second reinforcing member portion 400". Optionally, the first reinforcing member portion 300" and the second reinforcing member portion 400" may be formed integrally. Optionally, the first reinforcing member portion 300" and the second reinforcing member portion 400" may be spaced apart to form separate member portions.

Exemplarily, a part of the first reinforcing member portion 300" may be embedded into the tower 520. That is, the tower 520 may wrap a part of the first reinforcing member portion 300". Therefore, the first reinforcing member portion 300" may not be polluted by contaminants such as external dust, the first reinforcing member portion 300" may be prevented from being oxidized, and the mechanical strength thereof may be ensured, so that the insulating housing 500 may be protected better.

Exemplarily, the first reinforcing member portion 300" may be of a rod shape. The rod shape includes, but is not limited to, a round rod shape or a rectangular rod shape. The rod-shaped first reinforcing member portion 300" is convenient to process and has low manufacturing cost. Furthermore, the space in the tower 520 is relatively smaller, and the rod-shaped first reinforcing member portion 300" has a more compact structure so as to be more suitable for being embedded in the tower 520.

Exemplarily, the first reinforcing member portion 300" may be disposed above the base body recess 590. Although the base body recess 590 may affect the strength of the base body 510, the first reinforcing member portion 300 may improve the mechanical strength of the base body 510, so that deformation or cracking of the base body 510 can be avoided.

Exemplarily, the second recess 560 may extend toward the mounting surface 502 from the top of the tower 520. The first reinforcing member portion 300" may be arranged in the second recess 560. The second recess 560 is convenient to process and has low manufacturing cost. Furthermore, the first reinforcing member portion 300" may be inserted into the second recess 560 from the top of the tower 520. In this way, the insulating housing 500" and the first reinforcing member portion 300" may be assembled after being separately manufactured, so that production, manufacturing and mounting are facilitated, and the cost of the electrical connector 100" is reduced. In addition, the size of the first reinforcing member portion 300" in the vertical direction Z-Z may be extended as much as possible, so that the base body 510 and the tower 520 can be protected to a greater extent, and deformation or even cracking of the insulating housing 500 can be avoided.

Exemplarily, a second reinforcing member portion side tab 440 is arranged at a lower portion of the side wall, extending along the longitudinal direction X-X, of the reinforcing body 410 of the second reinforcing member portion 400 and extend downward. The second reinforcing member portion side tab 440 may be clamped into the side recesses 571. Exemplarily, the second reinforcing member portion side tab 440 may be clamped into the side recesses 571 in an interference fit manner. By this arrangement, the second reinforcing member portion 400" may be fixed. Furthermore, the size of the second reinforcing member portion 400" in the vertical direction Z-Z may be extended as much as possible, so that the tower 520 can be protected to a greater extent, and deformation or even cracking of the tower 520 can be avoided.

Optionally, both the first reinforcing member portion and the second reinforcing member portion may be embedded into the insulating housing. Optionally, the first reinforcing member portion and the second reinforcing member portion may be configured to be sequentially inserted into the insulating housing from the top of the tower. In this way, the first reinforcing member portion and the second reinforcing member portion are fixed firmly and convenient to mount.

It should be noted that the above may only describe the difference between the embodiments, the same reference numerals may be used for the same or similar components in the embodiments. Furthermore, for the sake of brevity, the same or similar components may not described in detail here.

The present disclosure has been described by the above embodiments, but it should be understood that a variety of variations, modifications and improvements may be made according to the teaching of the present disclosure by those skilled in the art, and all of these variations, modifications and improvements fall within the spirit and the scope of protection of the present disclosure. The scope of protection of the present disclosure is defined by the appended claims and its equivalent scope. The above embodiments are only for the purpose of illustration and description, and are not intended to limit the present disclosure to the scope of the described embodiments.

Various variations may be made to the structures illustrated and described herein. For example, the principles of the present disclosure are described above with respect to the card edge connectors, but the principles of the present disclosure can also be used in any suitable electrical connector, such as backplane connectors, daughter card connectors, stacking connectors, Mezzanine connectors, I/O connectors, chip sockets, Gen Z connectors, etc. When these connectors are placed side by side in close proximity, air flow may be blocked. The concepts of the present disclosure may provide beneficial assistance in creating air circulation between adjacent connectors to which printed circuit boards are attached.

Moreover, although many creative aspects have been described above with reference to the vertical connector, it should be understood that the aspects of the present disclosure are not limited to these. Any one of the creative features, whether alone or combined with one or more other creative features, can also be used for other types of electrical connectors, such as right angle connectors and coplanar connectors.

In the description of the present disclosure, it is to be understood that orientation words "front', "rear", "upper", "lower", "left", "right", "transverse direction", "vertical direction", "perpendicular", "horizontal", "top", "bottom" and the like are usually based on the orientation or positional relationship shown in the accompanying drawings and it is only for the purposes of the case in describing the present disclosure and simplification of its descriptions. Unless stated to the contrary, these orientation words do not indicate or imply that the specified member or element has to be specifically located, and structured and operated in a specific direction, and therefore, should not be understood as limitations to the present disclosure. The orientation words "inside" and "outside" refer to the inside and outside relative to the contour of each component itself.

For facilitating description, the spatial relative terms such as "on", "above", "on an upper surface of", "upper" and so on may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below." In addition, these components or features may be otherwise oriented (for example rotated by 90 degrees or other angles) and the present disclosure is intended to include all these cases.

It should be noted that the terms used herein are only for describing specific embodiments, and are not intended to limit the exemplary embodiments according to the present application. As used herein, an expression of a singular form includes an expression of a plural form unless otherwise indicated. In addition, it should also be understood that when the terms "including" and/or "comprising" are used herein, it indicates the presence of features, steps, operations, parts, components and/or combinations thereof.

It should be noted that the terms "first", "second" and the like in the description and claims, as well as the above accompanying drawings, of the present disclosure are used to distinguish similar objects, but not necessarily used to describe a specific order or precedence order. It should be understood that ordinal numbers used in this way can be interchanged as appropriate, so that the embodiments of the present disclosure described herein can be implemented in a sequence other than those illustrated or described herein.

What is claimed is:

1. An electrical connector, comprising:

a housing comprising a body comprising a mounting surface and an interfacing surface opposite to the mounting surface in a vertical direction, a tower protruding from an end of the interfacing surface in the vertical direction, and a slot comprising a first portion extending in the body in a longitudinal direction perpendicular to the vertical direction and a second portion extending in the tower in the vertical direction; and a reinforcing member comprising a first portion at least partially wrapping a distal end of the tower, and a second portion extending in the vertical direction beyond a joint between the tower and the body, wherein the second portion of the reinforcing member extends into the body of the housing by insertion into the first portion of the slot.

2. The electrical connector of claim 1, wherein:

the reinforcing member spans the joint and is connected to both the tower and the body of the housing.

3. The electrical connector of claim 1, wherein:

the joint is a first joint between the tower and the body on a first side of the slot;

the reinforcing member comprises a third portion extending in the vertical direction beyond a second joint between the tower and the body; and the second joint is on a second side of the slot opposite the first side.

4. The electrical connector of claim 1, wherein:

the first portion of the reinforcing member is on an exterior of the tower.

5. The electrical connector of claim 1, wherein:

the tower comprises a pair of side walls disposed on opposite sides of the slot in a transverse direction perpendicular to both the vertical direction and longitudinal direction, and an end wall connecting the pair of side walls;

the pair of side walls and the end wall at least partially surround the second portion of the slot; and the second portion of the reinforcing member extends along a side wall of the pair of side walls.

6. The electrical connector of claim 5, wherein:

the second portion of the reinforcing member comprises two parts, each of the two parts extending along a side wall of the pair of side walls.

7. The electrical connector of claim 5, wherein:

the first portion of the reinforcing member extends along the pair of side walls in the longitudinal direction and the end wall in the transverse direction.

8. The electrical connector of claim 1, comprising:

a plurality of conductive elements, each of the plurality of conductive elements comprising a mating contact portion curving into the first portion of the slot, and a mounting contact portion extending out of the body through the mounting surface.

9. The electrical connector of claim 1, wherein:

a transverse width of the tower is less than a transverse width of the body of the housing.

10. An electrical connector, comprising:

a body comprising a slot extending in a longitudinal direction and a recess at an end of the slot;

a latch pivotably connected to the body at a location in the recess and configured to move between a locked position and an unlocked position;

a tower disposed between the slot and the recess of the body and extending in a vertical direction perpendicular to the longitudinal direction, the tower being narrower than the body in a transverse direction perpendicular to both the longitudinal direction and the vertical direction; and a reinforcing member disposed on the tower and comprising a portion elongated in the vertical direction to or beyond a position aligned with the location in the recess in the longitudinal direction.

11. The electrical connector of claim 10, wherein:

the tower comprises a first recess extending along an outer side surface of the tower and into the body beyond a plane that an interfacing surface extends; and the reinforcing member is at least partially disposed in the first recess of the tower.

12. The electrical connector of claim 11, wherein:

the body comprises a plurality of second recesses extending toward a mounting surface;

the plurality of second recesses of the body are spaced apart in the longitudinal direction; and the reinforcing member comprises a plurality of tabs extending toward the mounting surface and disposed into respective ones of the plurality of second recesses.

13. The electrical connector of claim 10, wherein:

the portion of the reinforcing member elongated in the vertical direction is embedded in the tower.

14. The electrical connector of claim 13, wherein:

the portion of the reinforcing member extends into the body by insertion into the slot.

15. The electrical connector of claim 13, wherein:

the portion of the reinforcing member elongated in the vertical direction is rod-shaped.

16. The electrical connector of claim 10, wherein:

the reinforcing member further comprises a portion having a U-shaped cross-section in a plane perpendicular to the vertical direction with an opening of the U-shaped cross-section facing the slot.

17. The electrical connector of claim 16, wherein:

the tower comprises a first block protruding from a side wall and extending to an end wall and configured to at least partially support the portion of the reinforcing member having the U-shaped cross-section.

18. The electrical connector of claim 17, wherein:

the tower comprises a second block protruding from the side wall and having one end extending to a distal end of the tower and an other end extending to the body.

19. The electrical connector of claim 18, wherein:

the tower comprises a first recess between the first block and the second block; and the reinforcing member is at least partially disposed in the first recess of the tower.

20. An electrical connector, comprising:

a housing comprising a body having a slot elongated in a longitudinal direction, a pair of towers disposed on opposite ends of the slot and extending in a vertical direction perpendicular to the longitudinal direction;

a plurality of conductive elements held by the body of the housing, each of the plurality of conductive elements comprising a mating contact portion curving into the slot, and a mounting contact portion extending out of the body of the housing; and a pair of reinforcing members each at least partially disposed on one of the pair of towers and configured to support a joint between the body of the housing and a respective tower, wherein at least one of the pair of towers comprises a first block protruding from a side wall and extending to an end wall and configured to at least partially support a portion having a U-shaped cross-section of a respective reinforcing member of the pair of reinforcing members.

* * * * *